(12) United States Patent
Washiro

(10) Patent No.: US 9,608,300 B2
(45) Date of Patent: Mar. 28, 2017

(54) BATTERY DEVICE, BATTERY MANAGEMENT SYSTEM, AND BATTERY MANAGEMENT METHOD

(75) Inventor: Takanori Washiro, Kanagawa (JP)

(73) Assignee: SONY CORPORATION, Tokyo (JP)

(*) Notice: Subject to any disclaimer, the term of this patent is extended or adjusted under 35 U.S.C. 154(b) by 668 days.

(21) Appl. No.: 13/884,384

(22) PCT Filed: Nov. 7, 2011

(86) PCT No.: PCT/JP2011/075540
§ 371 (c)(1),
(2), (4) Date: Jun. 4, 2013

(87) PCT Pub. No.: WO2012/066950
PCT Pub. Date: May 24, 2012

(65) Prior Publication Data
US 2013/0285616 A1 Oct. 31, 2013

(30) Foreign Application Priority Data
Nov. 16, 2010 (JP) .................................. 2010-255810

(51) Int. Cl.
*H02J 7/00* (2006.01)
*H01F 27/42* (2006.01)
(Continued)

(52) U.S. Cl.
CPC ........... *H01M 10/46* (2013.01); *H01M 10/44* (2013.01); *H01M 10/48* (2013.01); *H02J 7/0047* (2013.01);
(Continued)

(58) Field of Classification Search
CPC ......................................................... H02J 7/025
(Continued)

(56) References Cited

U.S. PATENT DOCUMENTS

2009/0039833 A1* 2/2009 Kitagawa ...................... 320/134
2011/0127954 A1* 6/2011 Walley ................ H01M 2/0267
320/108

FOREIGN PATENT DOCUMENTS

JP 07-312649 A 11/1995
JP 11-318033 * 11/1999 ................ H02J 7/00
(Continued)

*Primary Examiner* — Edward Tso
*Assistant Examiner* — Ahmed Omar
(74) *Attorney, Agent, or Firm* — Chip Law Group

(57) ABSTRACT

The present invention relates to a battery device, a battery management system, and a battery management method which can facilitate management of a battery.
A battery device 11 includes a battery 51, an IC chip 53, and a direct-current blocking section 52. The direct-current power of the battery 51 is outputted via power lines 17, 18. By the IC chip 53, stored battery information is outputted via the power lines 17, 18 by load-modulating an alternating-current signal exchanged via the power lines 17, 18. By the direct-current blocking section 52, the direct-current power outputted via the power lines 17, 18 is blocked from being inputted to the IC chip 53. A voltage generating section 151 that is connected in parallel with the IC chip 53, and supplies a voltage generated by the alternating-current signal exchanged via the power lines 17, 18 to the IC chip 53 can be provided. The present invention can be applied to an electronic apparatus.

19 Claims, 15 Drawing Sheets

(51) Int. Cl.
  *H01F 37/00* (2006.01)
  *H01M 10/46* (2006.01)
  *H01M 10/44* (2006.01)
  *H01M 10/48* (2006.01)
  *H04B 3/54* (2006.01)
  *H02J 13/00* (2006.01)

(52) U.S. Cl.
  CPC .......... *H02J 7/0068* (2013.01); *H04B 3/546* (2013.01); *H02J 13/0003* (2013.01); *H02J 2007/0098* (2013.01); *H04B 2203/547* (2013.01)

(58) Field of Classification Search
  USPC ....................................................... 320/108
  See application file for complete search history.

(56) References Cited

FOREIGN PATENT DOCUMENTS

| JP | 11-318033 A | 11/1999 | |
|---|---|---|---|
| JP | 3289320 B2 | 6/2002 | |
| JP | 2003-257497 A | 9/2003 | |
| JP | 2007-109465 A | 4/2007 | |
| JP | 2009-089453 A | 4/2009 | |
| JP | 2010-246292 * | 10/2010 | ............ H02M 3/155 |
| JP | 2010-246292 A | 10/2010 | |
| WO | WO 2006/115037 A1 | 11/2006 | |

* cited by examiner

BATTERY DEVICE, BATTERY MANAGEMENT SYSTEM, AND BATTERY MANAGEMENT METHOD

TECHNICAL FIELD

The present invention relates to a battery device, a battery management system, and a battery management method, in particular, a battery device, a battery management system, and a battery management method which facilitate management of a battery.

BACKGROUND ART

Recently, battery devices are used in various products. In cases where the power to be used is large, the capacity of batteries also needs to be increased. With such increased capacity of battery devices, it is desired to ensure safety and reliability.

As a battery device increases in capacity, the number of its internal battery cells also increases, and the price also increases. For this reason, there is a fear that the user may disassemble the battery device and replace the internal battery cells with cheaper ones in an unauthorized manner.

The present applicant has previously proposed providing an IC chip inside a battery device, and making the IC chip store an identification number (for example, PTL 1). Consequently, by reading the identification number from the battery device, and performing an authentication process on the basis of the identification number that has been read, it is possible to discover and eliminate an invalid battery device.

CITATION LIST

Patent Literature

PTL 1: Japanese Patent Application No. 3289320

SUMMARY OF INVENTION

Technical Problem

In the previously proposed battery device, an information terminal is provided to the battery device separately from a terminal used for power supply, and identification information is read from the information terminal.

As a result, for example, in order to provide an IC chip to each of individual battery cells contained inside the battery device, and read identification information from each battery cell, it is necessary to provide as many information terminals as the number of battery cells. For example, in the case of an electric automobile, 100 or more battery cells need to be connected in series, which makes it difficult to secure communication lines. Moreover, the battery device increases in size, and also increases in cost. As a result, it is difficult to achieve a battery device that is easy to manage.

The present invention has been made in view of these circumstances, and facilitates management of a battery.

Solution to Problem

An aspect of the present invention is a battery device including a battery that outputs direct-current power via a power line, a memory element that outputs stored battery information via the power line, by load-modulating an alternating-current signal exchanged via the power line, and a direct-current blocking section that blocks the direct-current power outputted via the power line from being inputted to the memory element.

The memory element can be an electronic tag.

The battery device can further include a voltage generating section that is connected in parallel with the memory element, and supplies a voltage generated by the alternating-current signal exchanged via the power line to the memory element.

The voltage generating section can be formed by a coil or a transformer.

The direct-current blocking section can be formed by a capacitor.

The battery information stored in the memory element can include at least one of identification information, specifications information, history information, and billing information.

The battery device can include one or more battery cells, each of the battery cells can have the battery, the memory element, and the direct-current blocking section, and the memory element can store the identification information of the battery cell in which the memory element is installed.

The battery device can further include the memory element that stores the identification information of the battery device, and is not associated with the battery.

The memory element that is not associated with the battery can have precedence in outputting the battery information over the memory element of the battery cell.

The capacitor that forms the direct-current blocking section, and the coil that forms the voltage generating section can form a series resonant circuit whose center frequency is a fundamental frequency of a carrier of the alternating-current signal.

Another aspect of the present invention is a battery management system including a battery device including a battery that outputs direct-current power via a power line, a memory element that outputs stored battery information by load-modulating an alternating-current signal exchanged via the power line, and a direct-current blocking section that blocks the direct-current power outputted via the power line from being inputted to the memory element, a management device that supplies the alternating-current signal to the memory element via the power line to read the battery information and control charging or discharging of the battery, a high-pass filter that cuts off input of the direct-current power to the management device, and passes the alternating-current signal so that the management device can exchange the alternating-current signal with the memory element, and a low-pass filter that passes the direct-current power at discharging or charging to a block that operates on the direct-current power, and cuts off the alternating-current signal.

The battery management system can further include a switch that cuts off the direct-current power to the battery device at charging.

The management device can control the switch so as to cut off the direct-current power in a case where the battery information is invalid.

The management device can include a reader/writer that communicates with the memory element by the alternating-current signal, and a controller that controls operation of the reader/writer.

The battery device, the management device, the high-pass filter, and the low-pass filter can be included in an electronic apparatus.

The management device, the high-pass filter, and the low-pass filter can be included in a charging device that charges the battery device.

In an aspect of the present invention, direct-current power of the battery is outputted via a power line, and by the memory element, stored battery information is outputted via the power line by load-modulating an alternating-current signal exchanged via the power line. By the direct-current blocking section, the he direct-current power outputted via the power line is blocked from being inputted to the memory element.

In another aspect of the present invention, the management device supplies the alternating-current signal to the memory element via the power line to read the battery information and control charging or discharging of the battery, and the high-pass filter cuts off input of the direct-current power to the management device, and passes the alternating-current signal so that the management device can exchange the alternating-current signal with the memory element. The low-pass filter passes the direct-current power at discharging or charging to a block that operates on the direct-current power, and cuts off the alternating-current signal.

Advantageous Effects of Invention

As describe above, according to aspects of the present invention, management of a battery is facilitated.

DESCRIPTION OF EMBODIMENTS

Hereinafter, modes for carrying out the invention (hereinafter, referred to as embodiments) will be described. It should be noted that the description will be given in the following order.

1. First Embodiment (battery management system)
2. Second Embodiment (electronic apparatus)
3. Third Embodiment (charging system)
4. Modifications <1. First Embodiment>
[Fundamental Configuration of Battery Management System]

Figure 1:
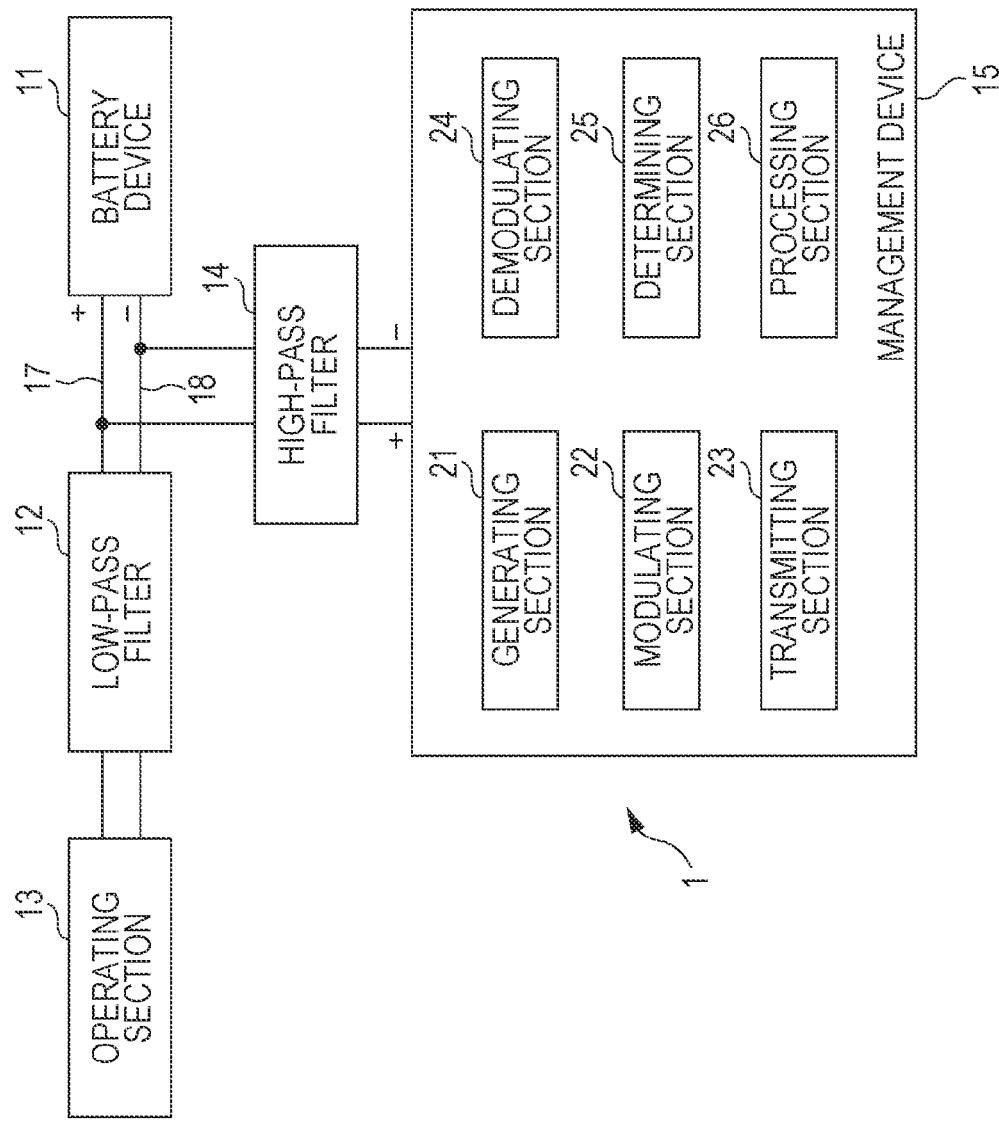
FIG. 1 is a block diagram illustrating a configuration of an embodiment of a battery management system according to the present invention.

FIG. 1 is a block diagram illustrating a configuration of an embodiment of a battery management system according to the present invention. This battery management system 1 includes a battery device 11, a low-pass filter 12, an operating section 13, a high-pass filter 14, and a management device 15.

The battery device 11 has one or more battery cells (battery cells 31-1 to 31-3 in FIGS. 2 to 4 described later) built therein, and supplies a direct-current voltage/direct current, that is, direct-current power to the operating section 13 via power lines 17, 18. The operating section 13 receives the supply of direct-current power from the battery device 11, and executes various operations. That is, the operating section 13 is a section to be supplied with direct-current power. The battery device 11 can be configured as, for example, a battery pack.

The low-pass filter 12 is arranged on the power lines 17, 18 between the battery device 11 and the operating section 13, and allows direct-current power to be supplied to the operating section 13, which is a block that operates on direct-current power. Moreover, the low-pass filter 12 cuts off an alternating-current signal generated by the management device 15 and transmitted via the power lines 17, 18, thereby preventing the alternating-current signal from being inputted to the operating section 13 that operates on direct-current power and causing a failure of the operating section 13.

The high-pass filter 14 passes the alternating-current signal generated by the management device 15, and causes the alternating-current signal to be supplied to the battery device 11 via the power lines 17, 18. Moreover, the high-pass filter 14 cuts off direct-current power transmitted via the power lines 17, 18, thereby preventing the direct-current power from causing a failure of the management device 15 that operates on alternating-current power.

The management device 15 that manages the battery device 11 outputs an alternating-current signal via the power lines 17, 18, and communicates with the battery device 11. The management device 15 has the following functional blocks: a generating section 21, a modulating section 22, a transmitting section 23, a demodulating section 24, a determining section 25, and a processing section 26.

The generating section 21 generates a command. The modulating section 22 modulates a carrier with the command, and outputs the result as an alternating-current signal. As the carrier, for example, a radio-frequency signal (also referred to as RF signal) with a frequency of 13.56 MHz is used. As the alternating-current signal, other than 13.56 MHz, it is also possible to use an arbitrary frequency such as 130 kHz to 135 kHz, 433 MHz, 900-MHz band, or 2.45 GHz. The transmitting section 23 outputs the alternating-current signal.

The demodulating section 24 demodulates the reflected wave of the alternating-current signal generated by load modulation from the battery device 11.

The determining section 25 performs various determination processes. The processing section 26 executes various processing on the basis of the determination results.

[Configuration (1) of Battery Device 11]

Figure 2:
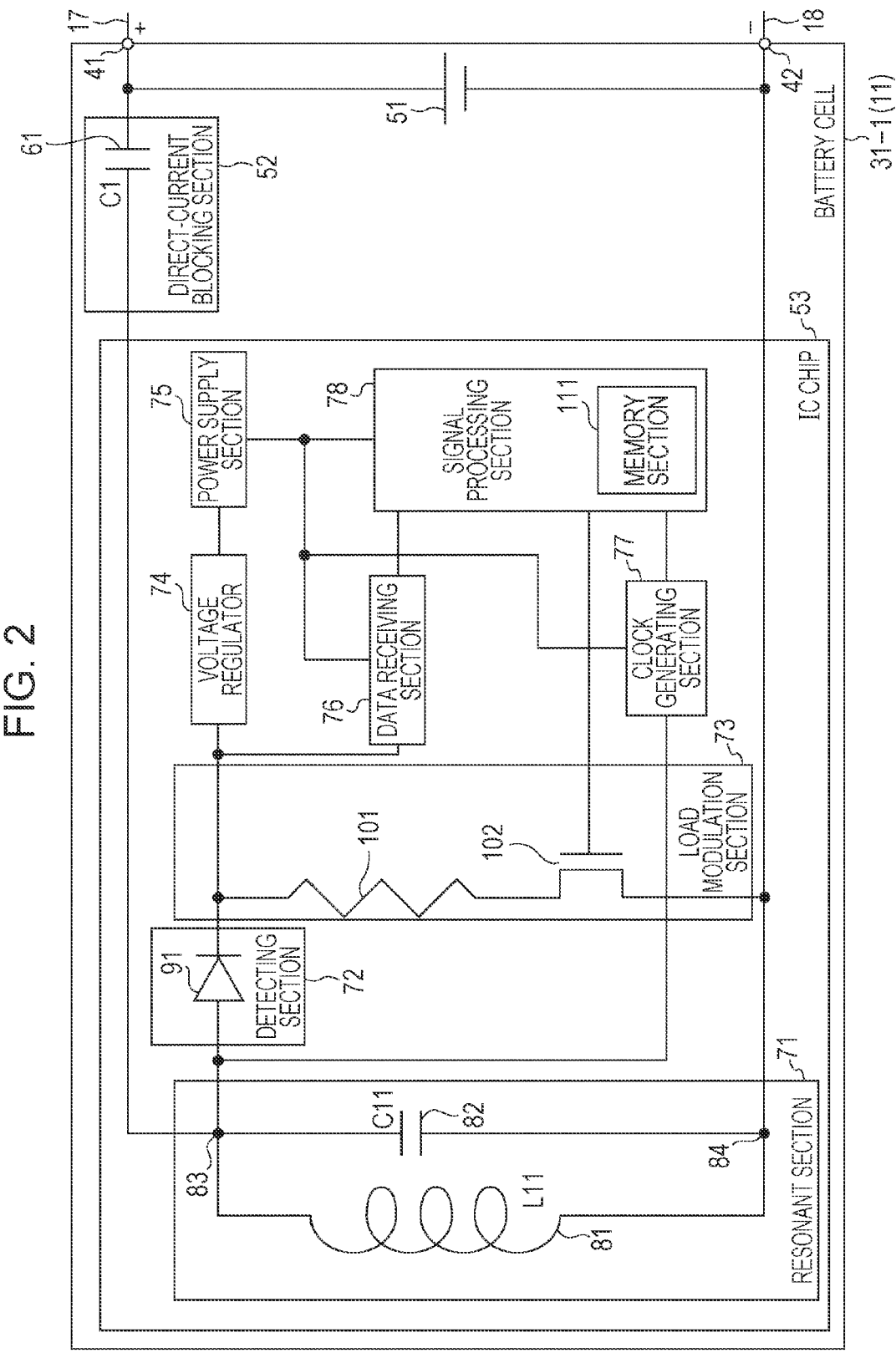
FIG. 2 is a block diagram illustrating a configuration of an embodiment of a battery device.

Next, a configuration example of the battery device 11 will be described. FIG. 2 is a block diagram illustrating a configuration of the battery device.

In FIG. 2, the battery device 11 includes one battery cell 31-1. The battery cell 31-1 includes a battery 51, a direct-current blocking section 52, and an IC chip 53.

The battery 51 outputs a positive voltage to the power line 17 from a terminal 41, and a negative voltage to the power line 18 from a terminal 42. The battery 51 is a rechargeable secondary battery. That is, the power lines 17, 18 each serve as a supply path for direct current/direct-current voltage at charging or discharging.

The direct-current blocking section 52 has the function of supplying an alternating-current signal supplied from the management device 15 via the power lines 17, 18, to the IC chip 53. The direct-current blocking section 52 also cuts off input of direct-current power to the IC chip 53 from the power line 17 serving as a supply path for direct-current power, thereby preventing a failure of the IC chip 53 that operates on an alternating-current signal. In the case of this embodiment, the direct-current blocking section 52 is configured by a capacitor 61 with a capacitance C1. The capacitor 61 is arranged between the positive terminal 17, and a positive voltage supply point 83 of the IC chip 53.

It should be noted that although an alternating-current signal is also inputted to the battery 51, as a result of experiment, there is no practical problem.

The IC chip 53 as a memory element can be configured by an electronic tag such as an IC chip or tag based on various standards. For example, not to mention standards such as RFID (Radio Frequency Identification), Mifare, Felica, and NFC (Near Field Communication) (all registered trademarks) but also an electronic tag with a unique configuration not based on these standards can be provided. The memory element has at least the function of reading and outputting internally stored information by an alternating-current signal, and preferably further has the function of storing supplied information. Either one of a passive type and an active type may be used.

The IC chip 53 in FIG. 2 includes a resonant section 71, a detecting section 72, a load modulation section 73, a voltage regulator 74, a power supply section 75, a data receiving section 76, a clock generating section 77, and a signal processing section 78.

The resonant section 71 is configured by a parallel resonant circuit of a coil 81 with an inductance L11 that functions as an antenna, and a capacitor 82 with a capacitance C11. One connecting point of the coil 81 and the capacitor 82 is the positive voltage supply point 83, and the other connecting point is a negative voltage supply point 84. The values of the inductance L11 and capacitor C11 are set so that the resonant frequency becomes 13.56 MHz. That is, the resonant section 71 having the coil 81 is originally intended to have the function of receiving an alternating-current signal with a frequency of 13.56 MHz from a coil 282 that functions as an antenna of a reader/writer 291-11 illustrated in FIG. 8 described later, and generating an alternating-current induced voltage by electromagnetic induction.

However, in the case of this embodiment, the alternating-current signal with a frequency of 13.56 MHz is not supplied from the coil 282 of the reader/writer 291-11 but is supplied from the management device 15 via the power lines 17, 18 and the capacitor 61. Accordingly, it is preferable to omit the resonant section 71 or at least its coil 81. Consequently, malfunction due to the influence of a nearby metal or the like is suppressed. In this case, an alternating-current signal is directly inputted to the detecting section 72. In a case where the resonant section 71 is not omitted, when an alternating-current signal with a frequency of 13.56 MHz is inputted, the resonant section 71 resonates to this signal, and generates voltage from the voltage supply points 83, 84.

The detecting section 72 is configured by a diode 91 in the case of this embodiment. The anode of the diode 91 is connected to the positive voltage supply point 83, and its cathode is connected to one end of a resistor 101 of the load modulation section 73. The diode 91 rectifies an alternating-current induced voltage from the voltage supply point 83 into a direct-current induced voltage, and demodulates a signal included in an alternating-current signal (carrier) transmitted from the reader/writer 291-11. One end of a FET (Field Effect Transistor) 102 constituting the load modulation section 73 together with the resistor 101 is connected to the other end of the resistor 101. It should be noted that the FET 102 as a switching element may be either one of p-channel and n-channel. Moreover, it is also possible to use a bipolar transistor.

The voltage regulator 74 smoothes and converts the voltage rectified by the diode 91 into a constant voltage, and supplies the voltage to the power supply section 75. The power supply section 75 generates a voltage for driving the IC chip, and supplies the voltage to the data receiving section 76, the clock generating section 77, and the signal processing section 78.

The data receiving section 76 extracts (amplitude-demodulates) low frequency components from a half-wave rectified voltage outputted from the diode 91, amplifies the low frequency components to generate a binarized data signal with a high level and a low level, and supplies the data signal to the signal processing section 78. The clock generating section 77 generates a square clock signal from an alternating-current signal supplied from the voltage supply point 83, and supplies the clock signal to the signal processing section 78.

The signal processing section 78 reads the data signal in synchronization with the clock signal. Then, on the basis of battery information stored in the built-in memory section 111, the signal processing section 78 generates a binarized response signal with a high level and a low level, and outputs the response signal to the gate of the FET 102. The FET 102 is turned on or off by the response signal. Consequently, load modulation that varies the impedance seen from the voltage supply points 83, 84 is performed. It should be noted that while at least identification information is included in the battery information, as will be described later, specifications information, history information, billing information, and the like can be also included.

[Configuration (2) of Battery Device 11]

Figure 3:
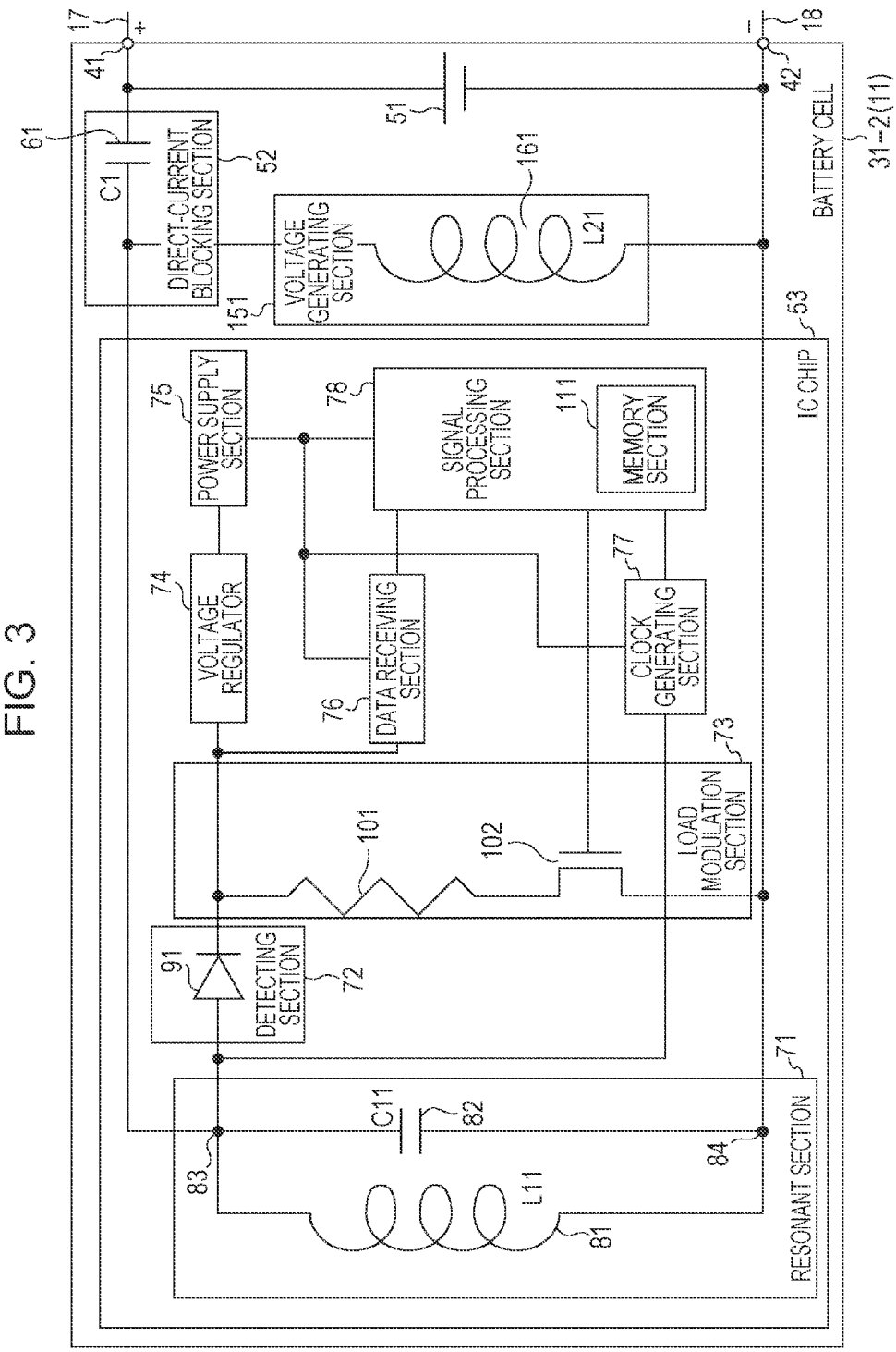
FIG. 3 is a block diagram illustrating another configuration of an embodiment of the battery device.

FIG. 3 is a block diagram illustrating another configuration of the battery device. This battery device 11 has one battery cell 31-2. The battery cell 31-2 has a voltage generating section 151 between the voltage supply points 83, 84. In the case of this embodiment, the voltage generating section 151 is configured by a coil 161 with an inductance L21. The coil 161 generates a voltage when an alternating-current signal is inputted from the management device 15 via the power lines 17, 18 and the capacitor 61, and supplies the voltage to the voltage supply points 83, 84. The coil 161 and the capacitor 61 can form a series resonant circuit that resonates to an alternating-current signal at 13.56 MHz.

The configuration is otherwise the same as in the case of FIG. 2, and a description thereof is omitted to avoid repetition. That is, in the case of this embodiment, voltage is generated by the voltage generating section 151 (both the resonant section 71 and the voltage generating section 151 in a case where the resonant section 71 is not omitted), and thus voltage can be generated more reliably in comparison to the embodiment in FIG. 2. Therefore, the embodiment in FIG. 3 is more advantageous in the case of transmitting an alternating-current signal to a large number of serially-connected battery cells via the power lines 17, 18.

[Configuration (3) of Battery Device 11]

Figure 4:
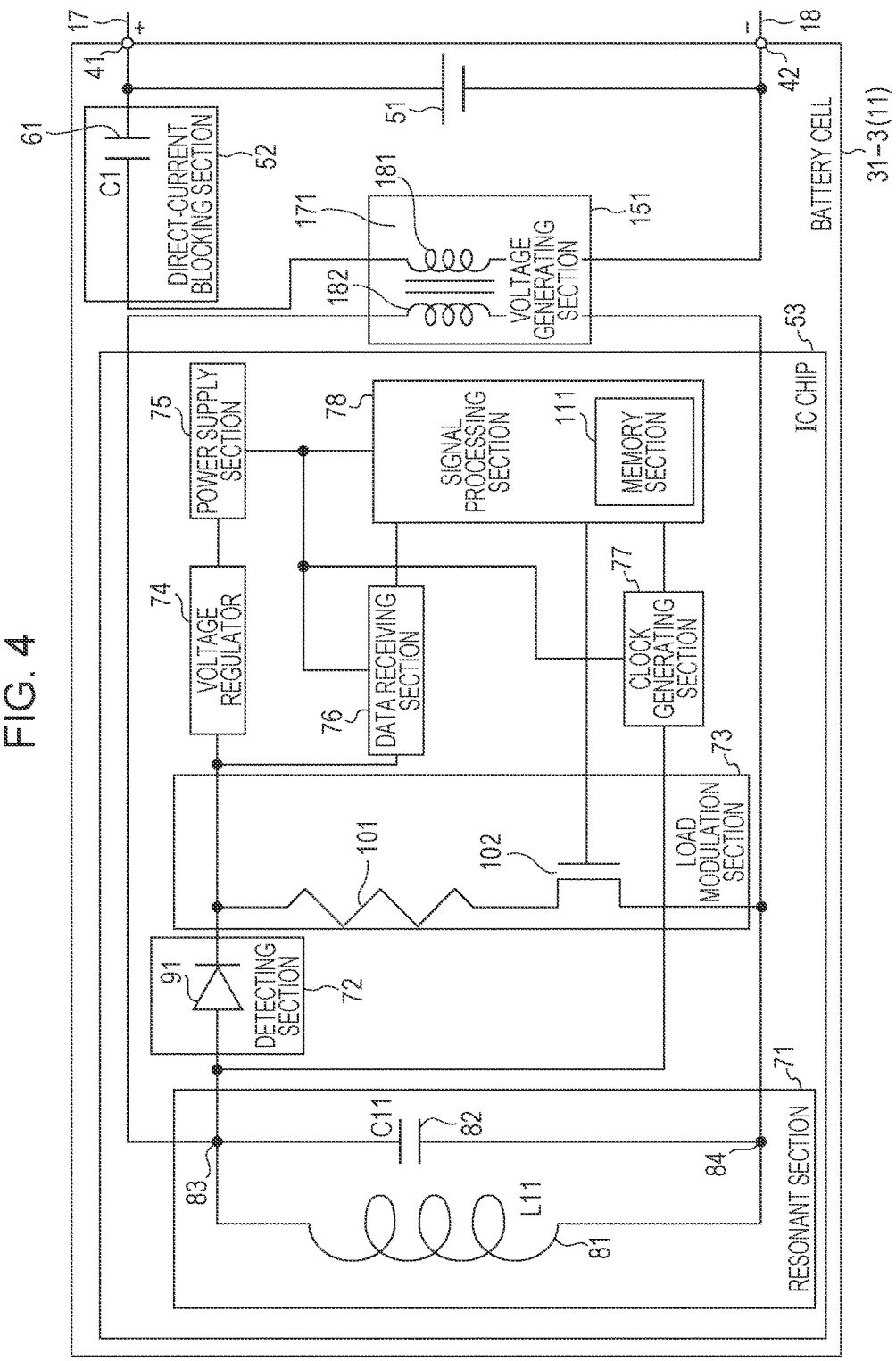
FIG. 4 is a block diagram illustrating still another configuration of an embodiment of the battery device.

FIG. 4 is a block diagram illustrating still another configuration of the battery device. This battery device 11 also has one battery cell 31-3. Like the battery cell 31-2, the battery cell 31-3 has the voltage generating section 151. However, the voltage generating section 151 according to this embodiment is configured by a transformer 171.

That is, the transformer 171 is configured by a coil 181 connected between one end of the capacitor 61 and the negative terminal 42, and a coil 182 connected between the voltage supply point 83 and the voltage supply point 84. When an alternating-current signal from the management device 15 is inputted to the coil 181, a voltage is induced in the coil 182 that is electromagnetically coupled, and the voltage is supplied to the voltage supply points 83, 84. The coil 181 and the capacitor 61 can form a series resonant circuit that resonates to an alternating-current signal at 13.56 MHz. In this case as well, the resonant section 71 can be omitted. The configuration is otherwise the same as in the embodiment in FIG. 2, and a description thereof is omitted to avoid repetition.

This embodiment in FIG. 4 is also advantageous in transmitting an alternating-current signal to a large number of serially-connected battery cells via the power lines 17, 18.

The battery device 11 as described above illustrated in FIGS. 2 to 4 is adopted for the battery management system 1 in FIG. 1.

[Authentication Process in Battery Management System]

Figure 5:
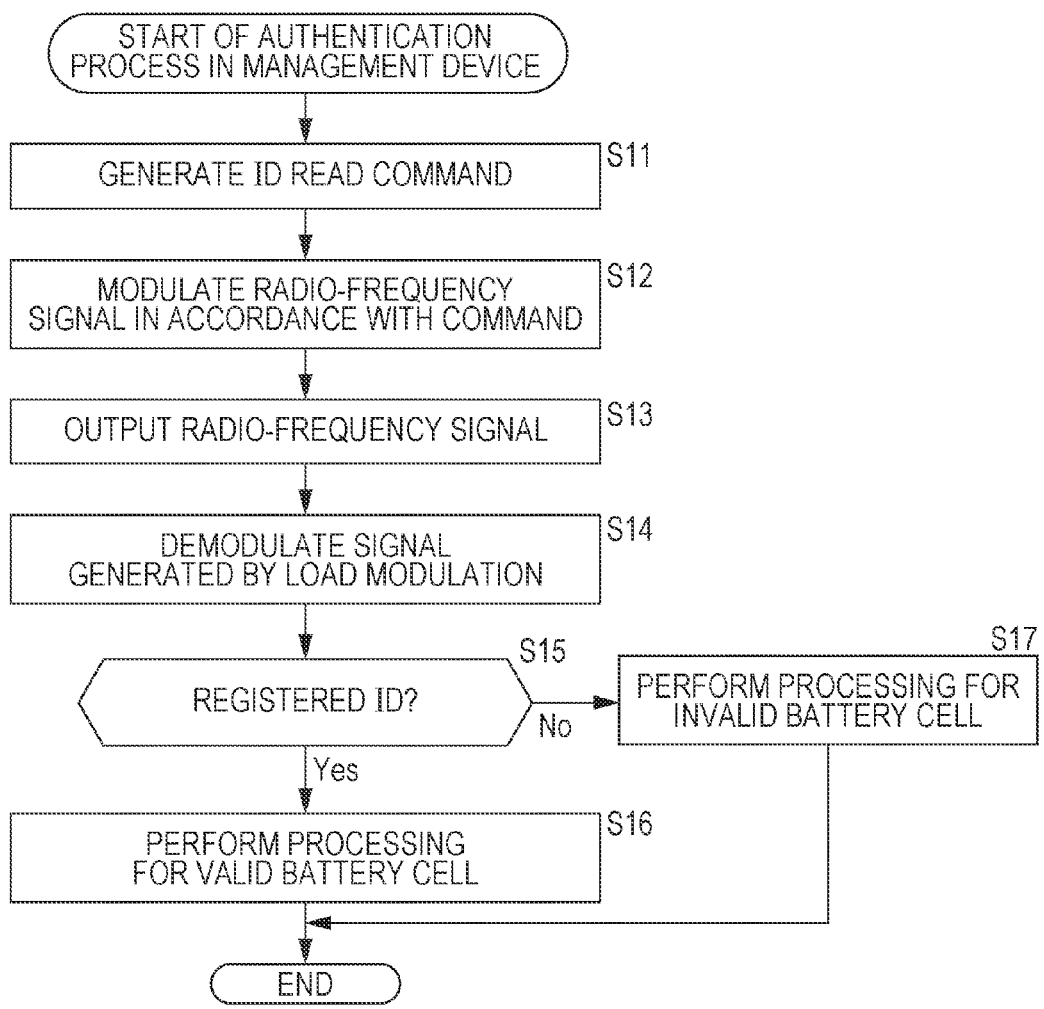
FIG. 5 is a flowchart illustrating an authentication process in a management device.
Figure 6:
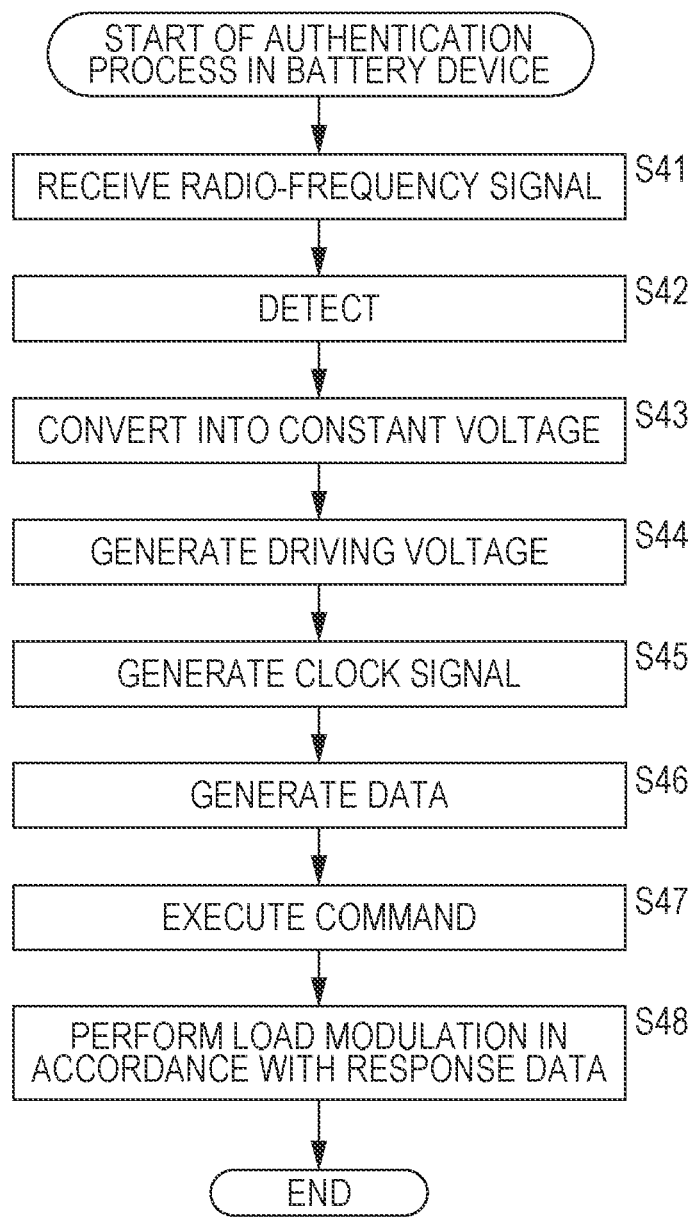
FIG. 6 is a flowchart illustrating an authentication process in the battery device.

FIG. 5 is a flowchart illustrating an authentication process in the management device, and FIG. 6 is a flowchart illustrating the corresponding authentication process in the battery device. Next, an authentication process performed in the battery management system 1 in FIG. 1 will be described with reference to the flowcharts of FIGS. 5 and 6. This authentication process is executed when the battery device 11 is installed in the battery management system 1, or when it is instructed by the user to start the process.

In step S11 in FIG. 5, the generating section 21 of the management device 15 generates an ID read command. That is, as described above, the signal processing section 78 of the battery cell 31 stores an ID (Identifier) as identification information for identifying itself, and a command for reading this ID is generated. It should be noted that in the following description, the battery cells 31-1 to 31-3 will be simply referred to as battery cell(s) 31 in cases where there is no need to individually distinguish between the battery cells. The same also applies to other components.

In step S12, the modulating section 22 modulates a radio-frequency signal as an alternating-current signal in accordance with the command. That is, the modulating section 22 amplitude-modulates a carrier with a frequency of 13.56 MHz as an alternating-current signal, in accordance with the command generated in step S11. In step S13, the transmitting section 23 outputs the radio-frequency signal.

The radio-frequency signal outputted from the management device 15 passes through the high-pass filter 14, and is transmitted to the power lines 17, 18. At this time, the low-pass filter 12 cuts off the radio-frequency signal, and thus the radio-frequency signal is not inputted to the operating section 13. Therefore, a failure of the operating section 13 that operates on the direct-current power from the battery device 11 is prevented. The low-pass filter 12 also has the function of preventing radio-frequency noise from flowing to the outside. In a case where a direct current outputted from the battery 11 is flowing through the power lines 17, 18, the radio-frequency signal is superimposed on the direct current.

In step S41 in FIG. 6, the battery cell 31 receives the radio-frequency signal. That is, the radio-frequency signal passes through the capacitor 61 and is inputted to the voltage supply points 83, 84. In a case where the resonant section 71 exists, the frequency of the carrier of the radio-frequency signal coincides with the resonant frequency of the resonant section 71. Thus, the resonant section 71 resonates to the radio-frequency signal, and a resonant voltage is induced at the voltage supply points 83, 84.

In step S42, the diode 91 detects an inputted radio-frequency voltage. That is, an alternating-current radio-frequency voltage is rectified, and a direct-current (more precisely, pulsating-current) voltage is generated. In step S43, the voltage regulator 74 smoothes and converts the rectified voltage into a constant voltage. In step S44, the power supply section 75 generates a driving voltage from the voltage converted into a constant voltage. The generated driving voltage is supplied to the data receiving section 76, the clock generating section 77, the signal processing section 78, and the like.

In step S45, the clock generating section 77 generates a square clock signal from an inputted radio-frequency voltage. The clock signal is supplied to the signal processing section 78. In step S46, the data receiving section 76 generates data. That is, signal components (i.e. amplitude components) included in the radio-frequency voltage (i.e. carrier) are extracted from the signal rectified by the diode 91, and are amplified. Consequently, a binarized data signal with a high level and a low level is generated, and is supplied to the signal processing section 78.

In step S47, the signal processing section 78 executes a command. That is, the signal processing section 78 reads a command from the data signal in synchronization with the clock signal, and executes processing corresponding to the read command. In the present case, an ID stored in the memory section 111 is read, and response data is generated. This response data is also binarized.

In step S48, the signal processing section 78 performs load modulation in accordance with the response data. That is, the FET 102 is turned on or off in accordance with the response data generated in the processing of step S47. The impedance seen from the voltage supply points 83, 84 differs between when the FET 102 is turned on and when the FET 102 is turned off. This change in impedance is reflected on the reflected wave of the radio-frequency signal, and is transmitted to the management device 15 via the power lines 17, 18.

In step S14 in FIG. 5, the demodulating section 24 of the management device 15 demodulates the signal of a reflected wave generated by load-modulation of the radio-frequency signal. Consequently, the ID of the battery cell 31 is read. In step S15, the determining section 25 determines whether or not the read ID is a registered ID. That is, a predetermined ID is assigned to an authorized battery cell 31 in advance, and the determining section 25 stores this assigned ID. It is determined whether or not the read ID matches a registered ID.

In a case where the read ID matches a registered ID, that is, when the battery cell 31 is authenticated, in step S16, the processing section 26 performs processing for an authorized battery cell. Specifically, the operating section 13 is permitted to execute its intended operation.

In contrast, in a case where the read ID does not match a registered ID, in step S17, the processing section 26 performs processing for an invalid battery cell. For example, the processing section 26 disables the operating section 13 to execute its intended operation. Further, the processing section 26 causes a warning message such as "This battery device is invalid. Replace with a valid battery device." to be displayed on a display constituting the operating section 13. The user replaces the battery device 11 with a valid one in accordance with this message. Consequently, a failure of the operating section 13, or occurrence of a fire is prevented.

<2. Second Embodiment>
[Configuration of Electronic Apparatus]

Next, an electronic apparatus to which the battery management system 1 is applied will be described.

Figure 7:
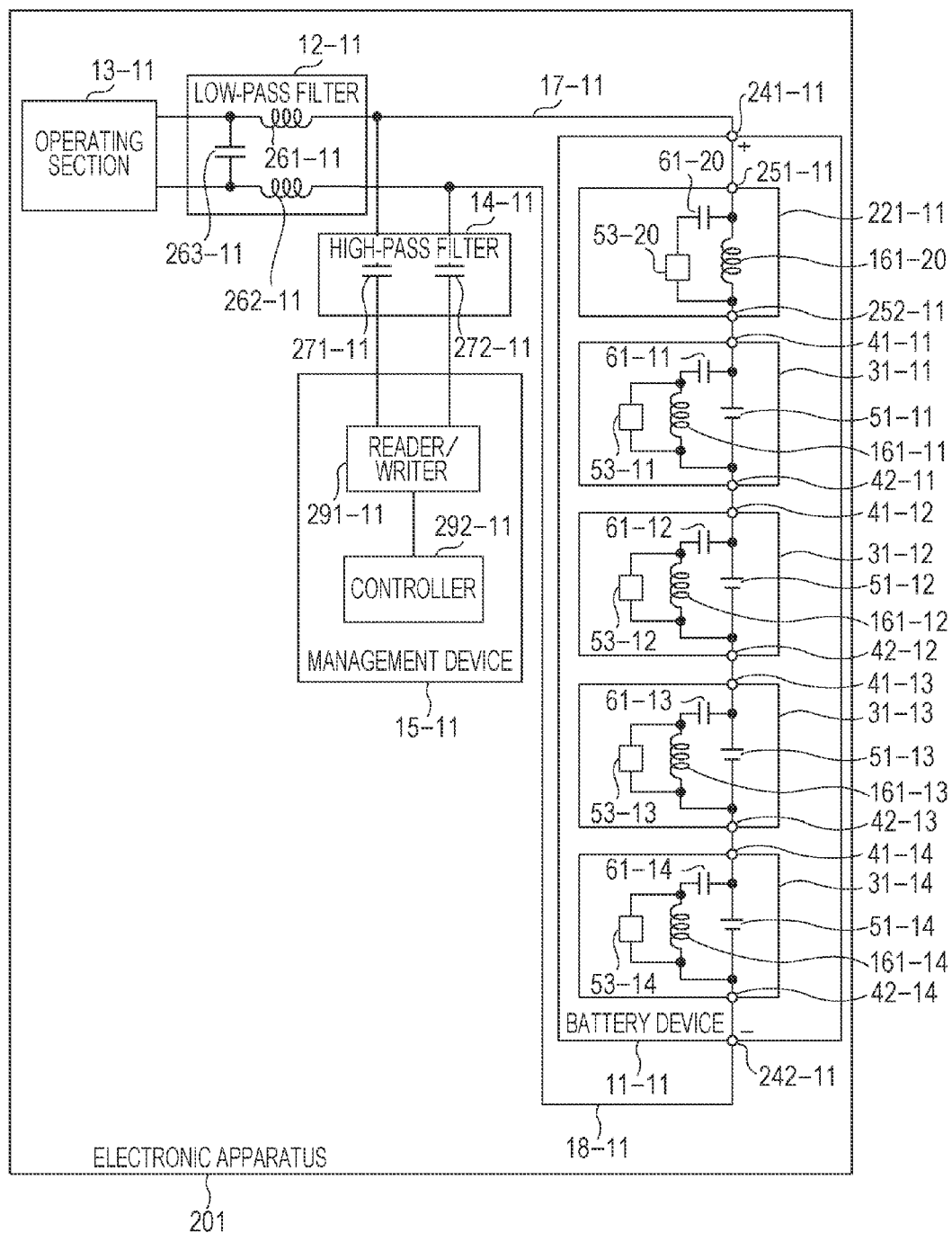
FIG. 7 is a block diagram illustrating a configuration of an embodiment of an electronic apparatus to which the battery management system according to the present invention is applied.

FIG. 7 is a block diagram illustrating a configuration of an embodiment of an electronic apparatus 201 to which the battery management system 1 according to the present invention is applied. The electronic apparatus 201 is an apparatus that operates on a battery, and for example, a personal computer, an electric automobile, or the like is considered.

In this embodiment, the electronic apparatus 201 has a battery device 11-11, a low-pass filter 12-11, an operating section 13-11, a high-pass filter 14-11, and a management device 15-11. The management device 15-11 includes the reader/writer 291-11 and a controller 292-11. The power for operating the reader/writer 291-11 and the controller 292-11 is supplied from an unillustrated internal power supply.

The battery device 11-11 has four battery cells 31-11 to 31-14, and one battery management cell 221-11. Terminals 241-11, 242-11 are terminals through which discharging current (charging current at charging) flows.

It should be noted that while in this embodiment four battery cells 31 are connected in series to achieve a capacity higher than that in the case of a single battery cell 31 illustrated in FIGS. 2 to 4, the number of battery cells 31 is arbitrary. Moreover, the battery cells 31 may be also connected in parallel to further increase capacity.

The battery cell 31-11 has a battery 51-11, a capacitor 61-11 as the direct-current blocking section 52, a coil 161-11 as the voltage generating section 151, and an IC chip 53-11, and outputs direct-current power from terminals 41-11, 42-11. The connection state thereof is the same as in the case illustrated in FIG. 3. Like the battery cell 31-11, the other battery cells 31-1$i$ ($i$=2, 3, 4) each have a battery 51-1$i$, a capacitor 61-1$i$ as the direct-current blocking section 52, a coil 161-1$i$ as the voltage generating section 151, and an IC chip 53-1$i$, and outputs direct-current power from terminals 41-1$i$, 42-1$i$. The connection state thereof is the same as in the case illustrated in FIG. 3.

The battery management cell 221-11 has a capacitor 61-20 as the direct-current blocking section 52, a coil 161-20 as the voltage generating section 151, and an IC chip 53-20. The battery management cell 221-11 does not have the battery 51. The capacitor 61-20 and the IC chip 53-20 are connected in series. The coil 161-20 is connected in parallel with the series circuit. The opposite ends of the coil 161-20 are connected to terminals 251-11, 252-11 that connect to a power supply line.

The battery cells 31-11 to 31-14, and the battery management cell 221-11 are connected in series. That is, the positive terminal 251-11 of the battery management cell 221-11 is connected to the terminal 241-11 that outputs a positive direct-current voltage, and the positive terminal 41-11 of the battery cell 31-11 is connected to the negative terminal 252-11 of the battery management cell 221-11.

Hereinafter, likewise, the negative terminal 42-11 of the battery cell 31-11 is connected to the positive terminal 41-12 of the battery cell 31-12, and the positive terminal 41-13 of the battery cell 31-13 is connected to the negative terminal 42-12 of the battery cell 31-12. The negative terminal 42-13 of the battery cell 31-13 is connected to the positive terminal 41-14 of the battery cell 31-14, and the negative terminal 242-11 of the battery device 11-11 is connected to the negative terminal 42-14 of the battery cell 31-14. Direct-current power is outputted from the positive terminal 241-11 and negative terminal 242-11 of the battery device 11-11.

The IC chips 53-11 to 53-14 of the battery cells 31-11 and 31-14 each store its own identification information. In contrast, the IC chip 53-20 of the battery management cell 221-11 stores identification information of the battery device 11-11.

A direct-current discharging current flows along the following path: a negative power line 18-11, the terminal 242-11, the terminal 42-14, the battery 51-14, the terminals 41-14, 42-13, the battery 51-13, the terminals 41-13, 42-12, the battery 51-12, the terminals 41-12, 42-11, the battery 51-11, the terminals 41-11, 252-11, the coil 161-20, the terminals 251-11, 241-11, and a positive power line 17-11.

A radio-frequency signal is inputted to the battery management cell 221-11 from the positive power line 17-11 and the terminals 241-11, 251-11. Inside the battery management cell 221-11, the radio-frequency signal flows through the coil 161-20, and also flows through the series circuit of the capacitor 61-20 and the IC chip 53-20, which is connected in parallel with the coil 161-20.

The radio-frequency signal inputted into the battery cell 31-11 via the terminals 252-11, 41-11 flows to the capacitor 61-11 and the coil 161-11, and also flows to the IC chip 53-11 that is connected in parallel with the coil 161-11.

Hereinafter, likewise, the radio-frequency signal flows through the battery cells 31-12, 31-13, 31-14, and is outputted from the terminal 242-11. Of course, the radio-frequency signal also flows along a path reverse to that mentioned above.

The low-pass filter 12-11 includes coils 261-11, 262-11 that are inserted in the power lines 17-11, 18-11, respectively, and a capacitor 263-11 that is connected between the power lines 17-11, 18-11.

The high-pass filter 14-11 includes a capacitor 271-11 that is inserted in a positive line branched off from the power line 17-11, and a capacitor 272-11 that is inserted in a negative line branched off from the power line 18-11.

[Configuration of Reader/Writer]

Figure 8:
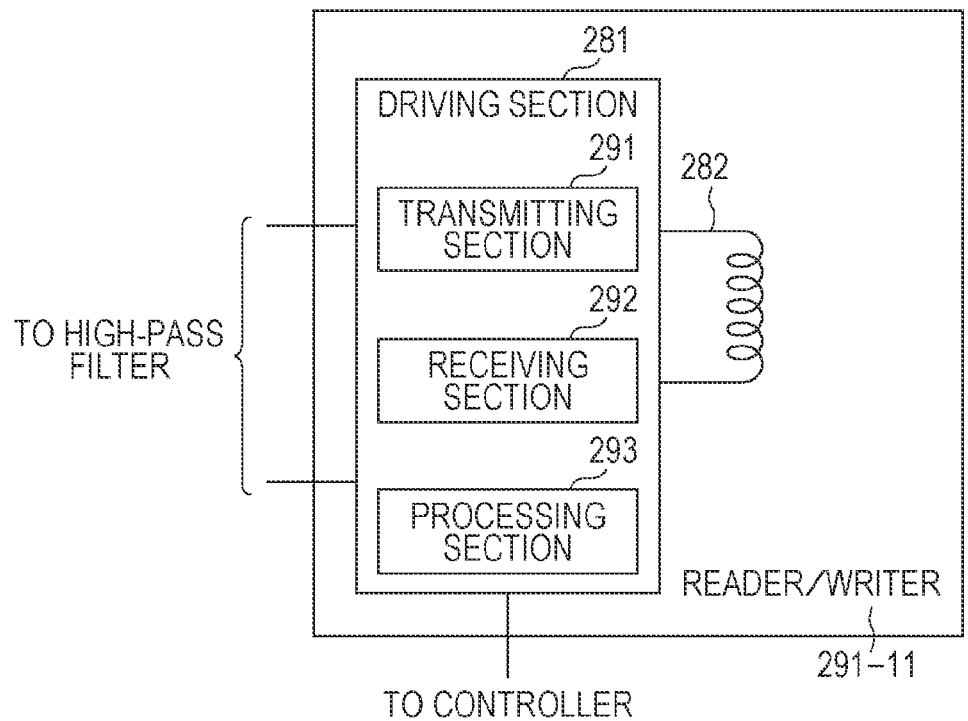
FIG. 8 is a block diagram illustrating a configuration of an embodiment of a reader/writer.

FIG. 8 is a block diagram illustrating a configuration of an embodiment of the reader/writer. The reader/writer 291-11 has a driving section 281 and a coil 282. The driving section 281 has the following functional blocks: a transmitting section 291, a receiving section 292, and a processing section 293.

The transmitting section 291 transmits a radio-frequency signal to the power lines 17-11, 18-11 via the high-pass filter 14-11. The receiving section 292 receives a radio-frequency signal transmitted to the power lines 17-11, 18-11 by the battery device 11-11, via the high-pass filter 14-11. The processing section 293 executes communication with the battery device 11-11 and the controller 292-11.

The coil 282 of the reader/writer 292-11 is originally intended to serve the purpose of exchanging a radio-frequency signal between the reader/writer 291-11 and the IC chip 53 by electromagnetically coupling with the coil 81 of the IC chip 53. That is, the reader/writer 291-11 is provided for writing/reading information in accordance with the standard of the IC chip 53. However, in this embodiment, a radio-frequency signal is exchanged via the power lines 17-11, 18-11. That is, a radio-frequency signal otherwise intended to be exchanged by means of the coil 282 is superimposed on the power lines via the high-pass filter, and communication with the IC chip is performed via the power lines. Thus, the coil 282 used for electromagnetic coupling through a space can be omitted. Consequently, there is less fear of unnecessary electromagnetic waves being radiated to the surroundings or noise being picked up to cause malfunction.

[Configuration of Controller]

Figure 9:
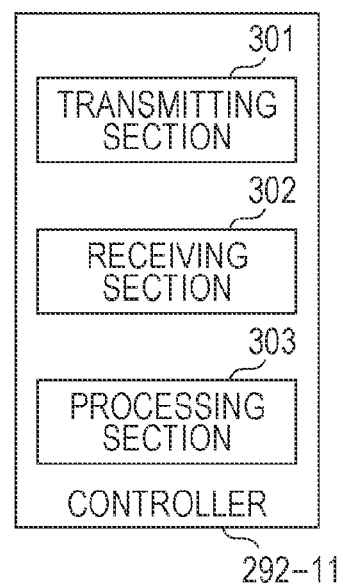
FIG. 9 is a block diagram illustrating a configuration of an embodiment of a controller.

FIG. 9 is a block diagram illustrating a configuration of an embodiment of the controller 292-11. For example, the controller 292-11 configured by a MPU (Micro Processor Unit), a CPU (Central Processing Unit), or the like has the following functional blocks: a transmitting section 301, a receiving section 302, and a processing section 303.

The transmitting section 301 transmits a command to the reader/writer 291-11. The receiving section 302 receives a signal corresponding to a signal received from the battery device 11-11, which is transmitted by the reader/writer 291-11. The processing section 303 executes processing corresponding to the signal that is received from the battery device 11-11 via the reader/writer 291-11.

[Authentication Process in Electronic Apparatus]

Figure 10:
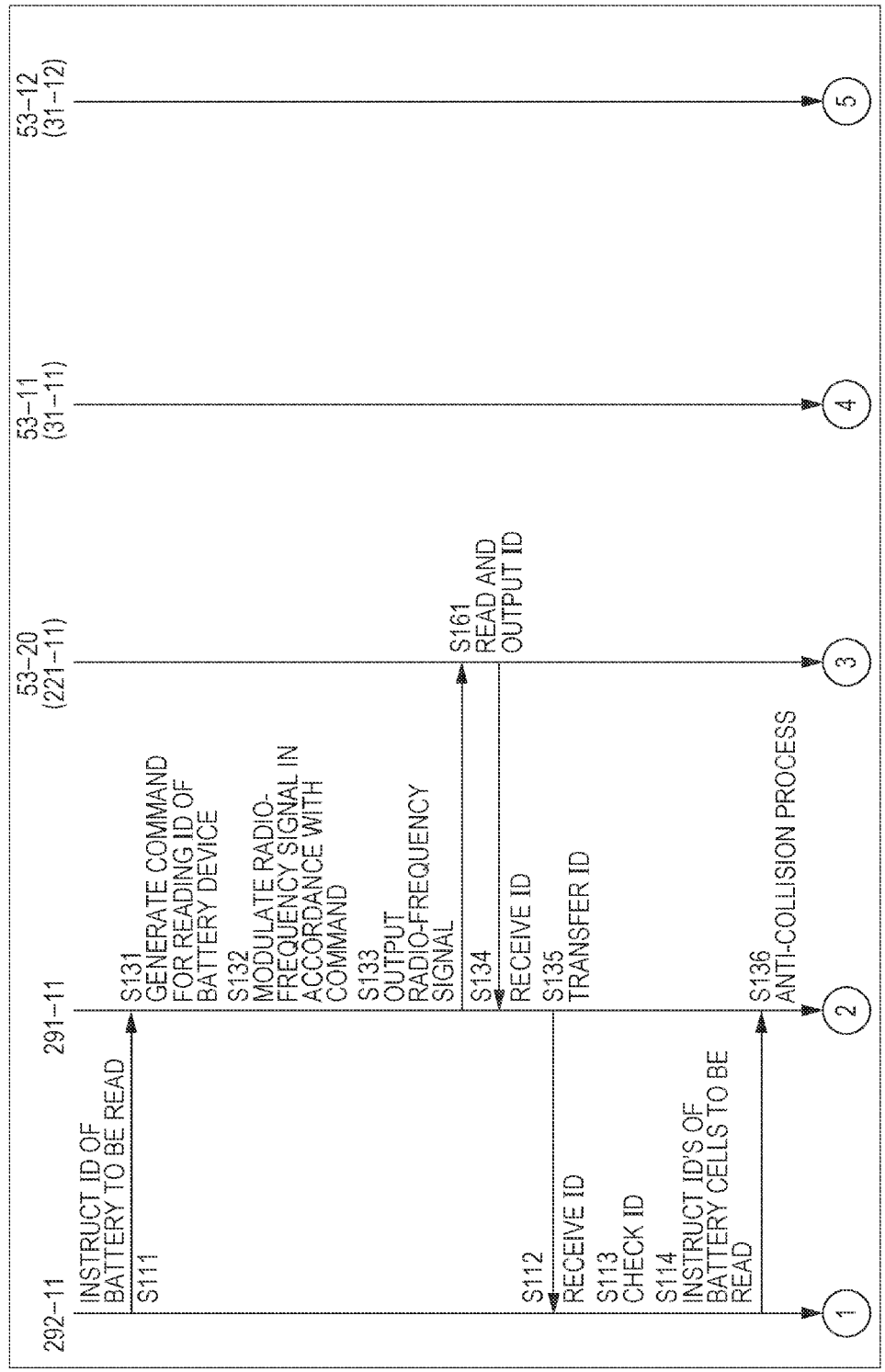
FIG. 10 is a flowchart illustrating an authentication process.
Figure 11:
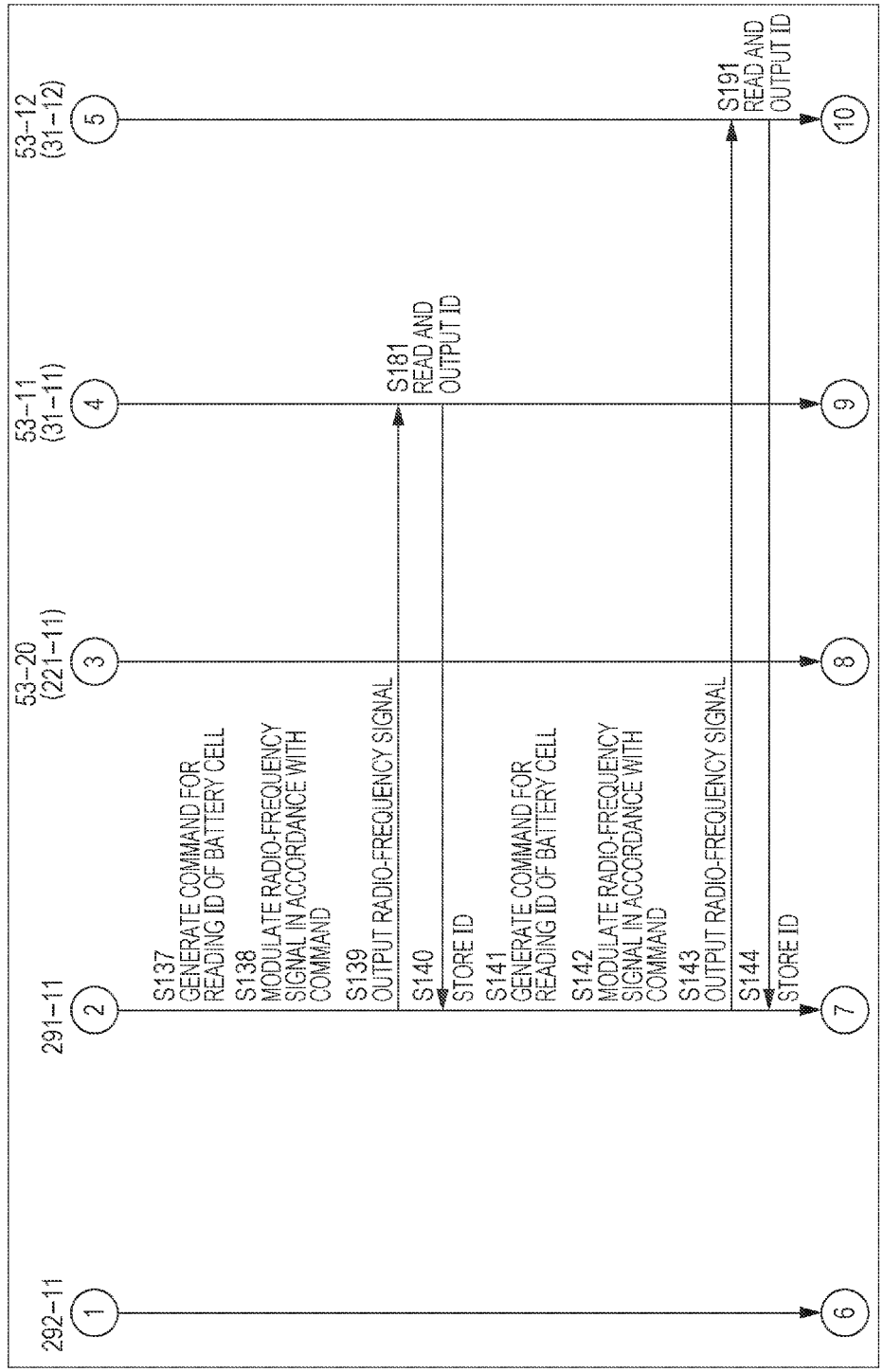
FIG. 11 is a flowchart illustrating an authentication process.
Figure 12:
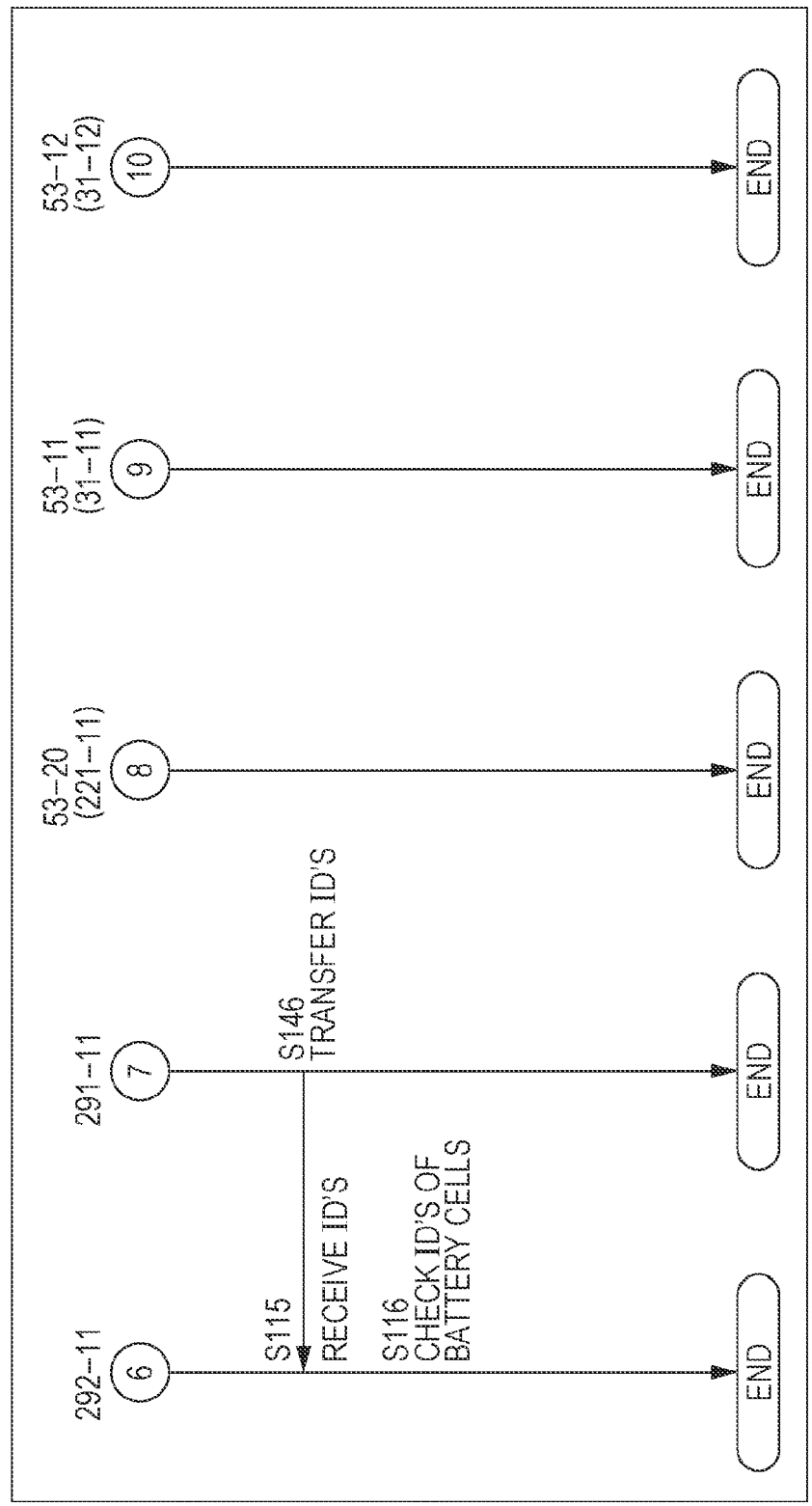
FIG. 12 is a flowchart illustrating an authentication process.

FIGS. 10 to 12 are flowcharts illustrating an authentication process. Hereinafter, an authentication process in the electronic apparatus 201 will be described with reference to FIGS. 10 to 12. This authentication process is executed when the battery device 11-11 is installed in the electronic apparatus 201, or when it is instructed by the user to start the process.

In step S111 in FIG. 10, the transmitting section 301 of the controller 292-11 instructs the ID of the battery device 11-11 to be read. That is, an ID read command for the reader/writer 291-11 is generated, and the command is transmitted to the reader/writer 291-11.

It should be noted that since the processing related to exchange of a radio-frequency signal is as already described with reference to FIGS. 5 and 6, a description thereof is omitted here.

In step S131, the receiving section 292 of the reader/writer 291-11 receives the command from the controller 292-11. At this time, the transmitting section 291 of the reader/writer 291-11 generates an ID read command for the battery device 11-11. In step S132, the transmitting section 291 of the reader/writer 291-11 further modulates a radio-frequency signal in accordance with the command. Then, in step S133, the transmitting section 291 outputs the radio-frequency signal. That is, the modulated radio-frequency signal is transmitted to the power lines 17-11, 18-11 via the high-pass filter 14-11. At this time, the low-pass filter 12-11 cuts off input of the radio-frequency signal to the operating section 13-11, thereby preventing a failure of the operating section 13-11 that operates on direct-current power.

The IC chip 53-20 of the battery management cell 221-11 is ranked so as to communicate in precedence to the IC chips 53-11 to 53-14 of the battery cells 31-11 to 31-14. For example, in each battery device 11, an ID is assigned which allows the built-in battery management cell 221 to be designated while being differentiated from the battery cell 31. Therefore, by designating the IC chip 53-20 of the battery management cell 221-11 as the destination ID for the command, it is possible to communicate with the IC chip 53-20 of the battery management cell 221-11. Alternatively, the ID of the battery management cell 221-11 is set so that the ID can be read by a smaller output from the reader/writer 291-11 in comparison to the IDs of the battery cells 31-11 to 31-14. By initially setting the output of the reader/writer 291-11 small, and then making the output larger, the battery management cell 221 can be given precedence in communication. As a result, quick processing becomes possible.

It should be noted that it is also possible not to give precedence to the IC chip 53-20 of the battery management cell 221-11 over the IC chips 53-11 to 53-14 of the other battery cells 31-11 to 31-14. In this case, processing is performed in the order according to ranking based on an anti-collision process described later.

In step S161, the IC chip 53-20 of the battery management cell 221-11 receives the radio-frequency signal that is transmitted from the reader/writer 291-11 in the processing of step S133. Then, an ID stored in the memory section 111 of the IC chip 53-20 is read and outputted. Detailed processing in the IC chip 53-20 in this case is the same as in the case described with reference to FIG. 6, and a description thereof is omitted to avoid repetition.

In step S134, the receiving section 292 of the reader/writer 291-11 receives the ID transmitted via the power lines 17-11, 18-11. In step S135, the transmitting section 291 transfers the received ID.

In step S112, the receiving section 302 of the controller 292-11 receives the ID from the reader/writer 291-11. In step S113, the processing section 303 checks the received ID. That is, in the same manner as in the case described with reference to FIG. 5, authentication is performed by comparing the received ID with a registered ID. In a case where the received ID does not match a registered ID, the processing section 303 executes the same processing as in the case of step S17 in FIG. 5. That is, a warning indicating that the battery device 11-11 is invalid is displayed, and operation of the operating section 13-11 is disabled. In a case where the ID is determined to be invalid, the subsequent processing is not executed.

In a case where the ID is authenticated to be genuine, further, a process of reading IDs from the IC chips 53 of the respective battery cells 31 is executed. That is, in step S114, the transmitting section 301 instructs the IDs of the battery cells 53 to be read.

In step S136, the receiving section 292 of the reader/writer 291-11 receives the instruction from the controller 292-11. The transmitting section 292 executes an anti-collision process at this time. That is, by a method such as a time slot scheme or a slot marker scheme, for example, the order of communications is assigned so that the IC chips 53-11 to 53-14 of the respective battery cells 31-11 to 31-14 communicate at staggered timings. Although a detailed description of each scheme is omitted, this prevents a situation where two or more of the IC chips 53-11 to 53-14 communicate with the reader/writer 291-11 simultaneously, making communication practically impossible.

Now, for example, suppose that communications are assigned in the order of the IC chip 53-11, the IC chip 53-12, the IC chip 53-14, and the IC chip 53-13.

Then, in step S137, the transmitting section 291 of the reader/writer 291-11 generates an ID read command for the battery cell 31-11. In step S138, the transmitting section 291 of the reader/writer 291-11 further modulates a radio-frequency signal in accordance with the command. Then, in step S139, the transmitting section 291 outputs the radio-frequency signal. That is, the modulated radio-frequency signal is transmitted to the power lines 17-11, 18-11 via the high-pass filter 14-11.

At the moment, communication is possible for the battery cell 31-11. Accordingly, in step S181, the IC chip 53-11 of the battery cell 31-11 receives the radio-frequency signal that is transmitted from the reader/writer 291-11 in the processing of step S139. Then, an ID stored in the memory section 111 of the IC chip 53-11 is read and outputted. Detailed processing in the IC chip 53-11 in this case is also the same as in the case described with reference to FIG. 6, and a description thereof is omitted to avoid repetition.

In step S140, the receiving section 292 of the reader/writer 291-11 receives the ID transmitted via the power lines 17-11, 18-11. The receiving section 292 temporarily stores the received ID.

Next, in step S141, the transmitting section 291 of the reader/writer 291-11 generates an ID read command for the battery cell 31-12. In step S142, the transmitting section 291 of the reader/writer 291-11 further modulates a radio-frequency signal in accordance with the command. Then, in step S143, the transmitting section 291 outputs the radio-frequency signal. That is, the modulated radio-frequency signal is transmitted to the power lines 17-11, 18-11 via the high-pass filter 14-11.

At the moment, communication is possible for the battery cell 31-12. Accordingly, in step S191, the IC chip 53-12 of the battery cell 31-12 receives the radio-frequency signal that is transmitted from the reader/writer 291-11 in the processing of step S143. Then, an ID stored in the memory section 111 of the IC chip 53-12 is read and outputted. Detailed processing in the IC chip 53-12 in this case is also the same as in the case described with reference to FIG. 6, and a description thereof is omitted to avoid repetition.

In step S144, the receiving section 292 of the reader/writer 291-11 receives the ID transmitted via the power lines 17-11, 18-11. The receiving section 292 temporarily stores the received ID.

Hereinafter, in the same manner, communication is performed in the order of the IC chip 53-14 and the IC chip 53-13, and their IDs are read.

When the IDs of all of the battery cells 31 have been read as described above, in step S146, the transmitting section 291 transmits the read IDs to the controller 292-11. It should be noted that the read IDs may be transferred one by one, rather than being transferred all at once.

In step S115, the receiving section 302 of the controller 292-11 receives the IDs transmitted from the reader/writer 291-11. In step S116, the processing section 303 checks the IDs of the battery cells 31. That is, in this case as well, the same processing as in the case of step S113 (that is, steps S15 to 17 in FIG. 5) is executed.

In this way, authentication is performed on a per-battery-cell basis, and in a case where there is even one invalid battery cell 31, a warning is displayed, and operation of the operating section 13 is disabled. Consequently, a failure of the electronic apparatus 201, or occurrence of a fire is prevented, thereby ensuring safety and reliability of the battery device 11-11. Moreover, even when the number of battery cells 31 becomes large, it is possible to communicate with all of the battery cells 31 easily without providing a dedicated independent communication line for each battery cell 31, thereby facilitating manufacture and also reducing cost.

<3. Third Embodiment>
[Configuration of Charging System]

Figure 13:
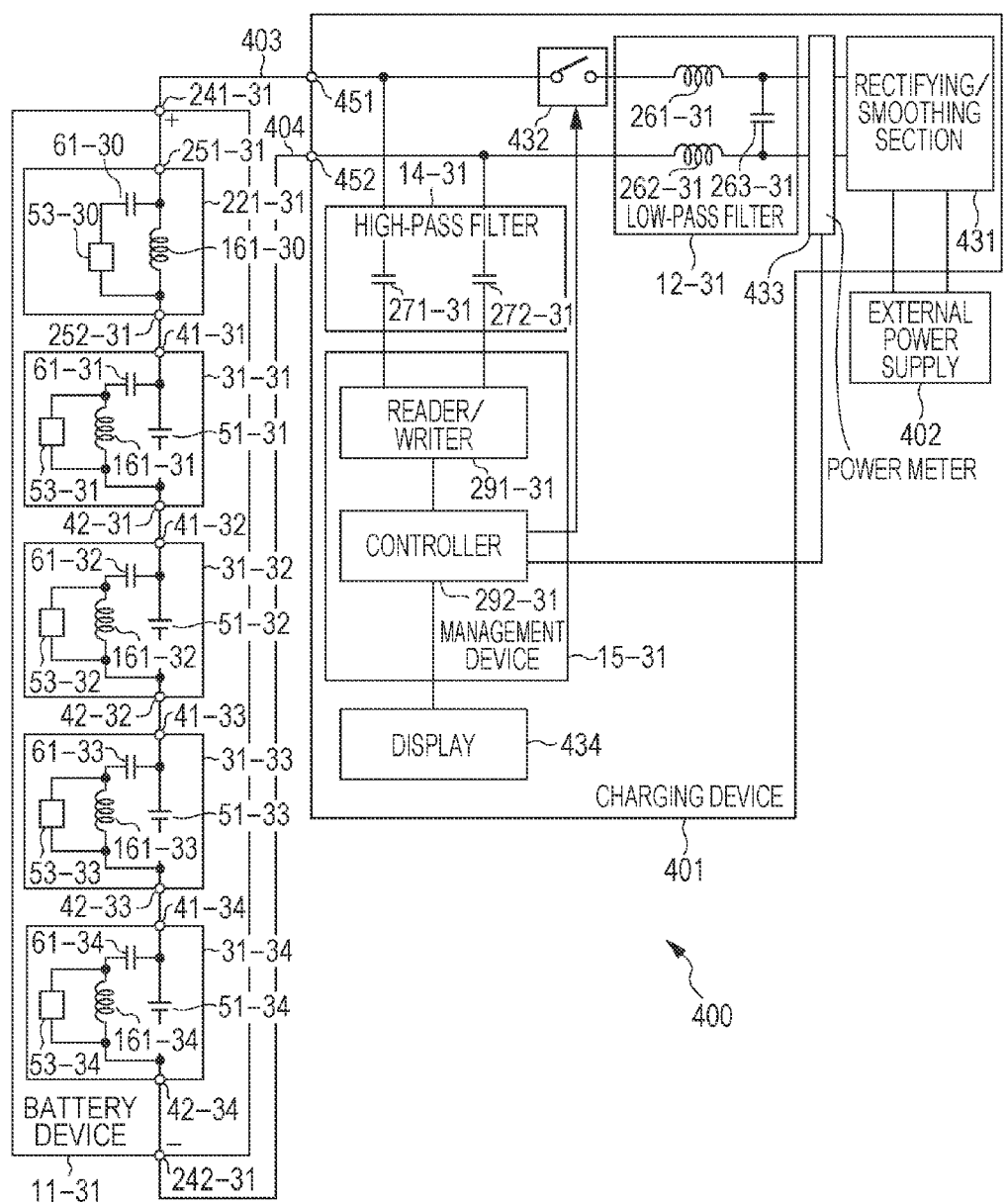
FIG. 13 is a block diagram illustrating a configuration of an embodiment of a charging system to which the battery management system according to the present invention is applied.

FIG. 13 is a block diagram illustrating a configuration of an embodiment of a charging system to which the battery management system 1 according to the present invention is applied. This charging system 400 includes a charging device 401, an external power supply 402, a battery device 11-31, and charging cables 403, 404 as power lines.

In a case where the battery device 11-31 is a battery device of an electric automobile, the charging device 401 can be arranged in a charging station.

The charging device 401 has a rectifying/smoothing section 431, a low-pass filter 12-31, a switch 432, a high-pass filter 14-31, a management device 15-31, a power meter 433, and a display 434.

The rectifying/smoothing section 431 rectifies and smoothes alternating-current power from the external power supply 402, and outputs the result as charging direct-current power to terminals 451, 452 via the low-pass filter 12-31 and the switch 432. It should be noted that like the operating section 13-11 in the electronic apparatus 201 in FIG. 7, the rectifying/smoothing section 431 is a block that operates on direct-current power in the charging device 401. The low-pass filter 12-31 includes coils 261-31, 262-31 that are respectively inserted in two charging lines, and a capacitor 263-31 that is connected between two lines.

The switch 432 is arranged in two charging lines, and is controlled by a controller 291-31 described later. The switch 432 is turned on when starting charging, and turned off when ending charging. While the switch 432 is arranged in a positive charging line in the case of this embodiment, the switch 432 can be arranged in a negative charging line, or both of the lines. The high-pass filter 14-31 includes a capacitor 271-31 inserted in a positive charging line that is branched off, and a capacitor 272-31 inserted in a negative charging line.

The high-pass filter 14-31 enables exchange of a radio-frequency signal between the charging device 11-31 and a reader/writer 291-31 of the management device 15-31 via charging lines, and blocks direct-current charging power from being inputted to the reader/writer 291-31. Consequently, a failure of the reader/writer 291-31 that operates on alternating-current power is prevented.

The management device 15-31 to which alternating-current power is supplied from an unillustrated external device includes the reader/writer 291-31 and a controller 291-31. The controller 291-31 controls charging of the battery device 11-31 via the reader/writer 291-31. The display 434 is controlled by the controller 291-31, and displays predetermined information.

The power meter 433 measures and displays charging power, and outputs the measurement results to the controller 292-31. The power meter 433 is arranged between the low-pass filter 12-31 and the rectifying/smoothing section 431 so that a radio-frequency signal is not inputted.

The battery device 11-31 has the same configuration as that of the battery device 11-11 in FIG. 7. That is, the battery device 11-31 has four battery cells 31-31 to 31-34, and one battery management cell 221-31. Terminals 241-31, 242-31 are terminals through which discharging current (charging current at charging) flows.

It should be noted that as in the case of the embodiment in FIG. 7, the number of battery cells 31 is arbitrary, and may be further increased to achieve higher capacity.

The battery cell 31-31 has a battery 51-31, a capacitor 61-31 as the direct-current blocking section 52, a coil 161-31 as the voltage generating section 151, and an IC chip 53-31, and outputs direct-current power from terminals 41-31, 42-31. The connection state thereof is the same as in the case illustrated in FIG. 3. Like the battery cell 31-31, the other battery cells 31-3$i$ ($i$=2, 3, 4) each have a battery 51-3$i$, a capacitor 61-3$i$ as the direct-current blocking section 52, a coil 161-3$i$ as the voltage generating section 151, and an IC chip 53-3$i$, and outputs direct-current power from terminals 41-3$i$, 42-3$i$. The connection state thereof is the same as in the case illustrated in FIG. 3.

The battery management cell 221-31 has a capacitor 61-30 as the direct-current blocking section 52, a coil 161-30 as the voltage generating section 151, and an IC chip 53-30. The battery management cell 221-31 does not have the battery 51. The capacitor 61-30 and the IC chip 53-30 are connected in series. The coil 161-30 is connected in parallel with the series circuit. The opposite ends of the coil 161-30 are connected to terminals 251-31, 252-31 that connect to a power supply line.

The battery cells 31-31 to 31-34, and the battery management cell 221-31 are connected in series. That is, the positive terminal 251-31 of the battery management cell 221-31 is connected to the terminal 241-31 that outputs a positive direct-current voltage, and the positive terminal 41-31 of the battery cell 31-31 is connected to the negative terminal 252-31 of the battery management cell 221-31.

Hereinafter, likewise, the negative terminal 42-31 of the battery cell 31-31 is connected to the positive terminal 41-32 of the battery cell 31-32, and the positive terminal 41-33 of the battery cell 31-33 is connected to the negative terminal 42-32 of the battery cell 31-32. The negative terminal 42-33 of the battery cell 31-33 is connected to the positive terminal 41-34 of the battery cell 31-34, and the negative terminal 242-31 of the battery device 11-31 is connected to the negative terminal 42-34 of the battery cell 31-34. The positive terminal 241-31 and negative terminal 242-31 of the battery device 11-31 are terminals from which direct-current discharging power is outputted, and are terminals to which charging direct-current power is inputted.

A direct-current charging current flows along a path reverse to a discharging current. That is, the charging current flows along the following path: the positive charging cable 403, the terminals 241-31, 251-31, the coil 161-30, the terminals 252-31, 41-31, the battery 51-31, the terminals 42-31, 41-32, the battery 51-32, the terminals 42-32, 41-33, the battery 51-33, the terminals 42-33, 41-34, the battery 51-34, the terminals 42-34, 242-31, and the charging cable 404.

A radio-frequency signal is inputted to the battery management cell 221-31 from the positive charging cable 403 and the terminals 241-31, 251-31. Inside the battery management cell 221-31, the radio-frequency signal flows through the coil 161-30, and also flows through the series circuit of the capacitor 61-30 and the IC chip 53-30, which is connected in parallel with the coil 161-30.

The radio-frequency signal inputted into the battery cell 31-31 via the terminals 252-31, 41-31 flows to the capacitor 61-31 and the coil 161-31, and also flows to the IC chip 53-31 that is connected in parallel with the coil 161-31.

Hereinafter, likewise, the radio-frequency signal flows through the battery cells 31-32, 31-33, 31-34, and is outputted from the terminal 242-31. Of course, the radio-frequency signal also flows along a path reverse to that mentioned above.

The IC chips 53-31 to 53-34 of the battery cells 31-31 and 31-34 each store its own identification information. In contrast, the IC chip 53-30 of the battery management cell 221-31 stores identification information of the battery device 11-31.

The battery information includes history information, specifications information, and billing information, in addition to the identification information mentioned above. The history information can be information such as the date and time and the number of times of charging or discharging of a battery, battery capacity at the time of purchase, present battery capacity, and transition of the battery capacity. The specifications information can be information on conditions such as charging voltage, the specification value of charging current, appropriate temperature during use, and charged capacity. The billing information can be information necessary to bill for the power used or charged.

It should be noted that the reader/writer 291-31 is of the same configuration as the reader/writer 291-11 illustrated in FIG. 8, and the controller 292-31 is also of the same configuration as the controller 292-11 illustrated in FIG. 9. Therefore, in the following description, the configurations in FIGS. 8 and 9 are also cited as the configurations of the reader/writer 291-31 and controller 292-31.

[Charging Process]

Figure 14:
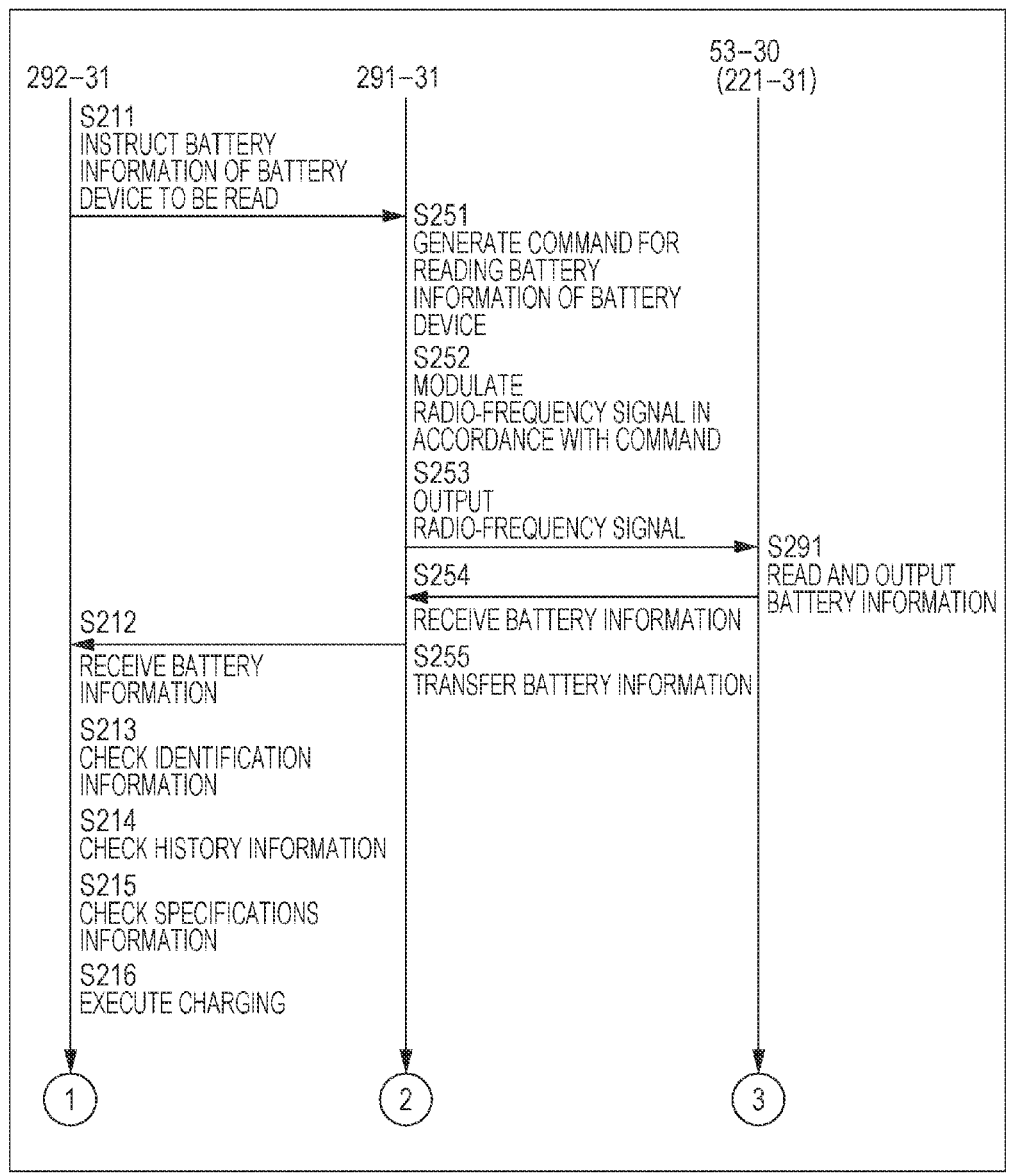
FIG. 14 is a flowchart illustrating a charging process.
Figure 15:
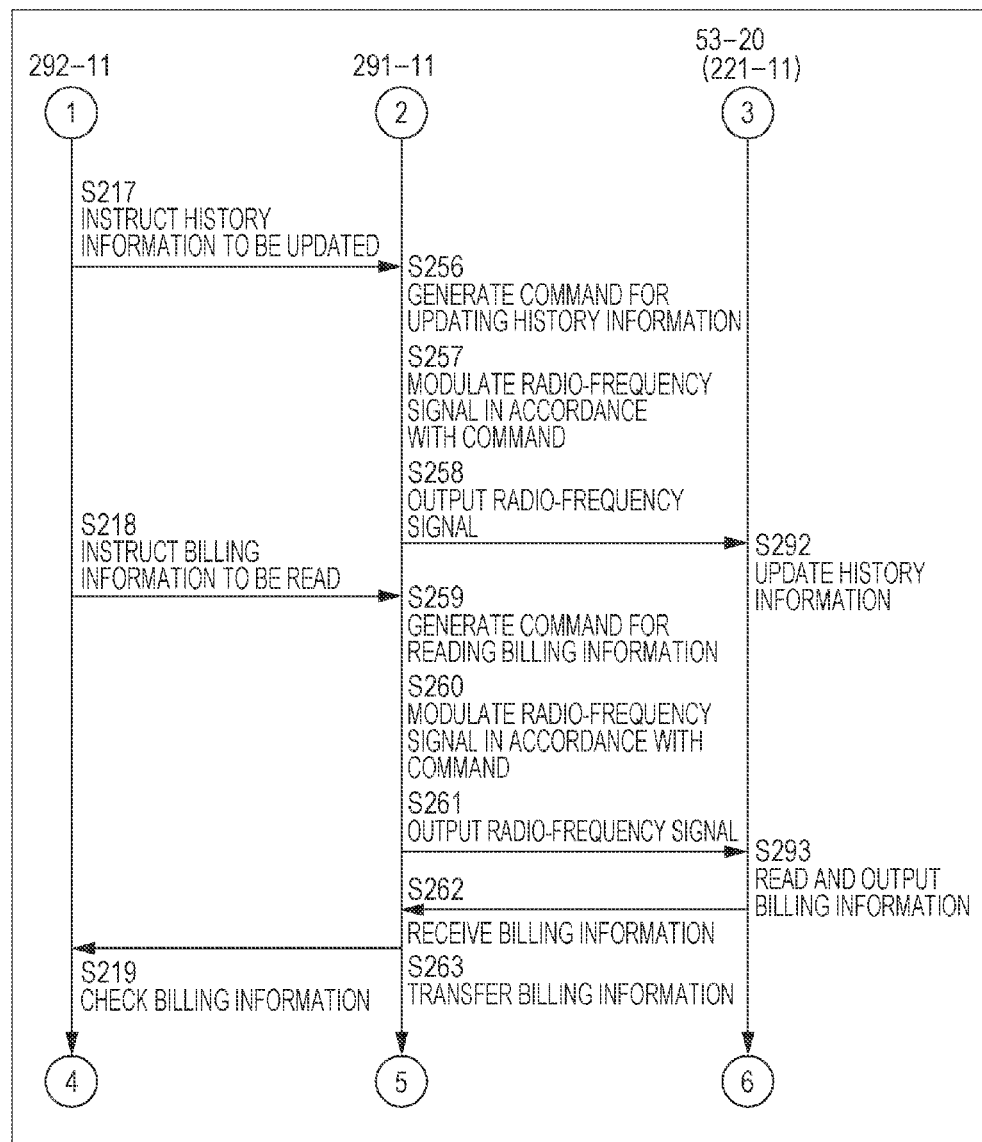
FIG. 15 is a flowchart illustrating a charging process.
Figure 16:
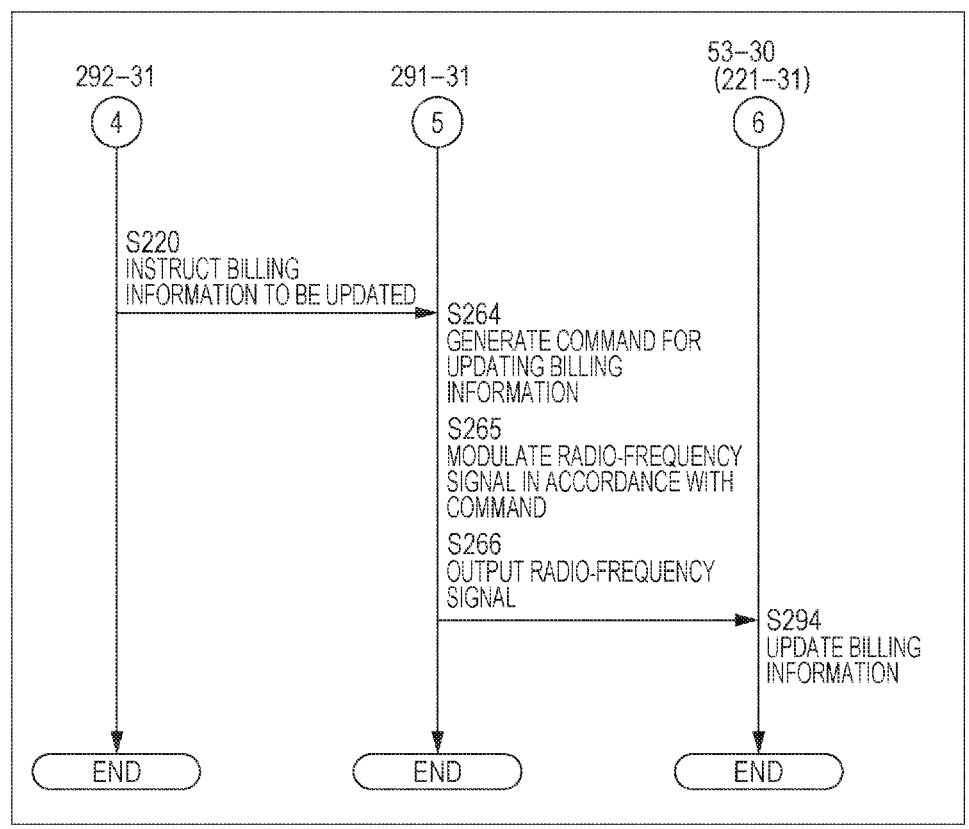
FIG. 16 is a flowchart illustrating a charging process.

FIGS. 14 to 16 are flowcharts illustrating a charging process. Hereinafter, a charging process in the charging system 400 will be described with reference to these figures. This process is started when the user instructs charging to be performed.

In step S211 in FIG. 14, the transmitting section 301 of the controller 292-11 instructs battery information of the battery device 11-31 to be read. That is, a battery information read command for the reader/writer 291-31 is generated, and the command is transmitted to the reader/writer 291-31. Since the processing related to exchange of a radio-frequency signal is as already described with reference to FIGS. 5 and 6, a description thereof is omitted here.

In step S251, the receiving section 292 of the reader/writer 291-31 receives the command from the controller 292-31. At this time, the transmitting section 291 of the reader/writer 291-31 generates a battery information read command for the battery device 11-31. In step S252, the transmitting section 291 of the reader/writer 291-31 further modulates a radio-frequency signal in accordance with the command. Then, in step S253, the transmitting section 291 outputs the radio-frequency signal. That is, the modulated radio-frequency signal is transmitted to the charging cables 403, 404 via the high-pass filter 14-31. At this time, the low-pass filter 12-31 cuts off input of the radio-frequency signal to the rectifying/smoothing section 431, thereby preventing a failure of the power meter 433 and the rectifying/smoothing section 43 that operate on direct-current power.

The IC chip 53-30 of the battery management cell 221-31 is ranked so as to communicate in precedence to the IC chips 53-31 to 53-34 of the battery cells 31-31 to 31-34. As described above, in each battery device 11, an ID is assigned which allows the built-in battery management cell 221 to be designated while being differentiated from the battery cell 31. Therefore, by designating the IC chip 53-30 of the battery management cell 221-31 as the destination ID for the command, it is possible to communicate with the IC chip 53-30 of the battery management cell 221-31. Alternatively, the ID of the battery management cell 221-31 is set so that the ID can be read by a smaller output from the reader/writer 291-31 in comparison to the IDs of the battery cells 31-31 to 31-34. By initially setting the output of the reader/writer 291-31 small, and then making the output larger, the battery management cell 221 can be given precedence in communication. As a result, quick processing becomes possible.

It should be noted that it is also possible not to give precedence to the IC chip 53-30 of the battery management cell 221-31 over the IC chips 53-31 to 53-34 of the other battery cells 31-31 to 31-34. In this case, processing for the IC chip 53-30 of the battery management cell 221-31 is performed in the order according to ranking based on the anti-collision process described above.

In step S291, the IC chip 53-30 of the battery management cell 221-31 receives the radio-frequency signal that is transmitted from the reader/writer 291-31 in the processing of step S253. Then, the signal processing section 78 of the IC chip 53-30 reads and outputs battery information stored in its memory section 111. Detailed processing in the IC chip 53-30 in this case is the same as in the case described with reference to FIG. 6, and a description thereof is omitted to avoid repetition.

In step S254, the receiving section 292 of the reader/writer 291-31 receives the battery information transmitted via the charging cables 403, 404. In step S255, the transmitting section 291 transfers the received battery information.

In step S212, the receiving section 302 of the controller 292-31 receives the battery information from the reader/writer 291-31. In step S213, the processing section 303 checks received identification information. That is, in the same manner as in the case described with reference to FIG. 5, authentication is performed by comparing the received identification information with registered identification information. In a case where the received identification information does not match registered identification information, the processing section 303 executes the same processing as in the case of step S17 in FIG. 5. That is, a warning indicating that the battery device 11-31 is invalid is displayed on the display 434, and charging is disabled. That is, the switch 432 is turned off. In a case where the identification information is determined to be invalid, the subsequent processing is not executed.

It should be noted that in this embodiment, only battery information of the IC chip 53-30 of the battery management cell 221-31 is read, and battery information of the IC chip 53 of the battery cell 31 is not read. However, the battery information may be read. In this case, an anti-collision process is performed as described above, and identification information from the IC chip 53 of each battery cell 31 is read sequentially. Then, charging can be disabled in a case where at least one battery cell 31 is invalid. The processing in this case is the same as in the case described with reference to FIGS. 10 to 12, and a description thereof is omitted to avoid repetition.

For example, in a case where the battery device 11-31 is installed in an electric automobile, the number of battery cells 31 contained is expected to become as many as 100 or more. If there is even a single invalid battery cell 31 among the battery cells 31, there is a fear that a fire may occur while driving, or it may be impossible to generate sufficient motor torque. However, performing authentication on a per-battery-cell basis in this way makes it possible to prevent such accidents from occurring.

In a case where the identification information is authenticated to be genuine, in step S214, the processing section 303 of the controller 292-31 checks history information. For example, in a case where the number of times of charging or discharging has reached a predetermined reference number of times, the processing section 303 causes the display 434 to display a message that urges replacement of the battery device 11-31 or the corresponding battery cell 31. Consequently, the battery device 11-31 can be used with safety by the user. Alternatively, a message urging disposal or recycling can be also displayed.

In step S215, the processing section 303 of the controller 292-31 checks specifications information. For example, the processing section 303 checks the rated voltage and rated current at charging, and controls the rectifying/smoothing section 431 so that charging is performed in accordance with the rated values. Consequently, the battery device can be charged under optimal conditions in a short time with efficiency. As a result, the lifetime of the battery device 11-31 can be extended.

The IC chips 53 of the respective battery cells 31 store their individual rated values. In contrast, the IC chip 53-30 of the battery management cell 221-31 stores the rated values of the battery device 11-31. Accordingly, by taking the conditions of the IC chip 53-30 into consideration, it is possible for the battery cells 31 to perform charging at specification values of the battery device 11-31 as a whole, which take the number of battery cells 31 connected in series or parallel into consideration.

In step S216, the processing section 303 executes charging. That is, the processing section 303 turns the switch 432 on. Consequently, a charging current outputted from the rectifying/smoothing section 431 flows along the following path: the power meter 433, the low-pass filter 12-31, the charging cable 403, the battery device 11-31, and the charging cable 404, and the batteries 51-31 to 51-34 are charged. When charging is completed (for example, when the charging voltage has reached a predetermined value), the processing section 303 turns the switch 432 off. Consequently, charging is stopped. The power consumed by the charging is measured by the power meter 433, and the processing section 303 is notified of the measurement results.

In step S217, the transmitting section 303 instructs history information to be updated. That is, a history information update command for the reader/writer 291-31 is generated, and the command is transmitted to the reader/writer 291-31. At this time, pieces of history information to be updated, such as the date and time of charging, power, and the number of times of charging incremented, are also transmitted.

In step S256, the receiving section 292 of the reader-writer 291-31 receives the command from the controller 292-31. At this time, the transmitting section 291 of the reader/writer 291-31 generates a history information update command for the battery device 11-31. In step S257, the transmitting section 291 of the reader/writer 291-31 further modulates a radio-frequency signal in accordance with the command. Then, in step S258, the transmitting section 291 outputs the radio-frequency signal. That is, the modulated radio-frequency signal is transmitted to the charging cables 403, 404 via the high-pass filter 14-31.

In step S292, the IC chip 53-30 of the battery management cell 221-31 receives the radio-frequency signal that is transmitted from the reader/writer 291-31 in the processing of step S258. Then, the signal processing section 78 of the IC chip 53-30 updates history information stored in the memory section 111 with the received history information.

In step S218, the transmitting section 301 of the controller 292-11 instructs billing information of the battery device 11-31 to be read. That is, a billing information read command for the reader/writer 291-31 is generated, and the command is transmitted to the reader/writer 291-31.

In step S259, the receiving section 292 of the reader/writer 291-31 receives the command from the controller 292-31. At this time, the transmitting section 291 of the reader/writer 291-31 generates a billing information read command for the battery device 11-31. In step S260, the transmitting section 291 of the reader/writer 291-31 further modulates a radio-frequency signal in accordance with the command. Then, in step S261, the transmitting section 291 outputs the radio-frequency signal. That is, the modulated radio-frequency signal is transmitted to the charging cables 403, 404 via the high-pass filter 14-31.

In step S293, the IC chip 53-30 of the battery management cell 221-31 receives the radio-frequency signal that is transmitted from the reader/writer 291-31 in the processing of step S261. Then, the signal processing section 78 reads and outputs billing information stored in its memory section 111.

In step S262, the receiving section 292 of the reader/writer 291-31 receives the billing information transmitted via the charging cables 403, 404. In step S263, the transmitting section 291 transfers the received billing information.

In step S219, the receiving section 302 of the controller 292-31 receives the billing information from the reader/writer 291-31, and communicates with a billing server connected via an unillustrated IP network or cellular network, and the processing section 303 checks the received billing information. For example, in a case where prepaid electronic money is included in the billing information, the processing section 303 subtracts an equivalent amount of value corresponding to the power that has been required for charging, from the prepaid electronic money.

In step S220, the transmitting section 301 of the controller 292-31 instructs the billing information to be updated. That is, a billing information update command for the reader/writer 291-31 is generated, and the command is transmitted to the reader/writer 291-31. At this time, the amount of prepared electronic money after subtraction is also transmitted.

In step S264, the receiving section 292 of the reader/writer 291-31 receives the command from the controller 292-31. At this time, the transmitting section 291 of the reader/writer 291-31 generates a billing information update command for the battery device 11-31. In step S265, the transmitting section 291 of the reader/writer 291-31 further modulates a radio-frequency signal in accordance with the command. Then, in step S266, the transmitting section 291 outputs the radio-frequency signal. That is, the modulated radio-frequency signal is transmitted to the charging cables 403, 404 via the high-pass filter 14-31.

In step S294, the IC chip 53-30 of the battery management cell 221-31 receives the radio-frequency signal that is transmitted from the reader/writer 291-31 in the processing of step S266. Then, the signal processing section 78 of the IC chip 53-30 updates billing information stored in the memory section 111 with the received billing information. Consequently, the prepaid electronic money is updated to the amount after subtraction.

It should be noted that the billing process may be such that the value corresponding to the power that has been required for charging is stored, and the processing for withdrawing the corresponding amount from the user's account is executed later.

The charging system 400 can be also applied to the case of charging the battery device 11-11 of the electronic apparatus 201 in FIG. 7.

<4. Modifications>

While a rechargeable secondary battery is used as a battery in the foregoing description, in a case where only discharging current is used, the present invention can be also applied to a non-rechargeable primary battery.

Also, the term system as used in this specification refers to the entirety of a device configured by a plurality of devices.

It should be noted that embodiments of the present invention are not limited to the embodiments described above, and various changes are possible without departing from the scope of the present invention.

REFERENCE SIGNS LIST

1 battery management system
11 battery device
12 low-pass filter
13 operating section
14 high-pass filter
15 management device
31-11 to 31-14 battery cell
53-11 to 53-14, 53-20 IC chip

The invention claimed is:

1. A battery device, comprising:
   a battery configured to output direct-current power via a power line;
   a memory element configured to output stored battery information via the power line, by load modulation of an alternating-current signal exchanged via the power line; and
   a direct-current blocking section, which is connected in series to the power line, configured to block the direct-current power outputted via the power line to be inputted to the memory element.

2. The battery device according to claim 1, wherein the memory element is an electronic tag.

3. A battery device, comprising:
   a battery configured to output direct-current power via a power line;
   a memory element configured to output stored battery information via the power line, by load modulation of an alternating-current signal exchanged via the power line;
   a direct-current blocking section configured to block the direct-current power outputted via the power line to be inputted to the memory element; and
   a voltage generating section configured to be connected in parallel with the memory element, and supply a voltage generated by the alternating-current signal exchanged via the power line to the memory element;
   wherein the voltage generating section includes a coil or a transformer.

4. The battery device according to claim 3, wherein the direct-current blocking section includes a capacitor.

5. The battery device according to claim 1, wherein the battery information is configured to be stored in the memory element that includes at least one of identification information, specifications information, history information, or billing information.

6. The battery device according to claim 5, further comprising:
   one or more battery cells, wherein each of the one or more battery cells has the battery, the memory element, and the direct-current blocking section, and the memory element is configured to store the identification information of a battery cell of the one or more battery cells in which the memory element is installed.

7. The battery device according to claim 6, wherein the memory element is configured to store the identification information of the battery device, and is unassociated with the battery.

8. The battery device according to claim 7, wherein the memory element, that is unassociated with the battery, is configured to output the battery information in precedence to the memory element of the battery cell.

9. The battery device according to claim 4, wherein a combination of the capacitor and the coil is a series resonant circuit whose center frequency is a fundamental frequency of a carrier of the alternating-current signal.

10. A battery management method for a battery device that includes a battery, a memory element, and a direct-current blocking section, comprising:
outputting direct-current power of the battery via a power line;
outputting stored battery information via the power line by load-modulating an alternating-current signal exchanged via the power line, by the memory element;
blocking the direct-current power outputted via the power line from being inputted to the memory element, by the direct-current blocking section which is connected in series to the power line; and
providing a voltage generating section configured to be connected in parallel with the memory element, and supply a voltage generated by the alternating-current signal exchanged via the power line to the memory element;
wherein the voltage generating section includes a coil or a transformer.

11. A battery management system, comprising:
a battery device including a battery which configured to output direct-current power via a power line, a memory element configured to output stored battery information by load modulation of an alternating-current signal exchanged via the power line, and a direct-current blocking section configured to block the direct-current power outputted via the power line to be inputted to the memory element;
a management device configured to supply the alternating-current signal to the memory element via the power line to read the battery information and control charging or discharging of the battery;
a high-pass filter configured to cut off input of the direct-current power to the management device, and pass the alternating-current signal so that the management device can exchange the alternating-current signal with the memory element; and
a low-pass filter configured to pass the direct-current power at discharging or charging to a block is configured to operate on the direct-current power, and cut off the alternating-current signal.

12. The battery management system according to claim 11, wherein the management device includes:

a reader/writer configured to communicate with the memory element by the alternating-current signal; and
a controller configured to control operation of the reader/writer.

13. The battery management system according to claim 12, wherein the battery device, the management device, the high-pass filter, and the low-pass filter are included in an electronic apparatus.

14. The battery management system according to claim 13, wherein the management device, the high-pass filter, and the low-pass filter are included in a charging device that is configured to charge the battery device.

15. The battery management system according to claim 14, further comprising:
a switch configured to cut off the direct-current power to the battery device at charging.

16. The battery management system according to claim 15, wherein the management device is configured to control the switch so as to cut off the direct-current power in a case where the battery information is invalid.

17. A battery management method for a battery management system, the battery management system including:
a battery device including a battery which configured to output direct-current power via a power line, a memory element configured to output stored battery information by load modulation of an alternating-current signal exchanged via the power line, and a direct-current blocking section configured to block the direct-current power outputted via the power line to be inputted to the memory element,
a management device,
a high-pass filter, and
a low-pass filter,
the method comprising:
supplying, by the management device, the alternating-current signal to the memory element via the power line to read the battery information and controlling charging or discharging of the battery;
cutting off, by the high-pass filter, input of the direct-current power to the management device, and passing the alternating-current signal so that the management device can exchange the alternating-current signal with the memory element; and
passing, by the low-pass filter, the direct-current power at discharging or charging to a block that operates on the direct-current power, and cutting off the alternating-current signal.

18. The battery device according to claim 1, further comprising:
a resonant section, wherein a coil of the resonant section is configured to function as an antenna based on reception of an alternating-current signal at a frequency.

19. The battery management system according to claim 11, further comprising:
a power meter configured to measure and display the power of the charging.

* * * * *